United States Patent
Ishikawa et al.

(10) Patent No.: US 11,108,293 B2
(45) Date of Patent: Aug. 31, 2021

(54) STATOR, MOTOR, COMPRESSOR, AND AIR CONDITIONER

(71) Applicant: Mitsubishi Electric Corporation, Tokyo (JP)

(72) Inventors: Atsushi Ishikawa, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 64 days.

(21) Appl. No.: 16/491,228

(22) PCT Filed: May 25, 2017

(86) PCT No.: PCT/JP2017/019558
§ 371 (c)(1),
(2) Date: Sep. 5, 2019

(87) PCT Pub. No.: WO2018/216169
PCT Pub. Date: Nov. 29, 2018

(65) Prior Publication Data
US 2020/0204029 A1 Jun. 25, 2020

(51) Int. Cl.
*H02K 3/34* (2006.01)
*H02K 3/12* (2006.01)

(52) U.S. Cl.
CPC ............. *H02K 3/345* (2013.01); *H02K 3/12* (2013.01)

(58) Field of Classification Search
None
See application file for complete search history.

(56) References Cited

U.S. PATENT DOCUMENTS

| | | | |
|---|---|---|---|
| 6,176,691 B1 * | 1/2001 | Tsubokawa | F04B 35/045 |
| | | | 310/215 |
| 10,192,652 B2 * | 1/2019 | Fujiwara | H02K 3/28 |
| 10,529,463 B2 * | 1/2020 | Yamoto | H01B 3/426 |
| 10,910,897 B2 * | 2/2021 | Mashkin | H02K 15/12 |
| 2008/0231136 A1 | 9/2008 | Obata | |
| 2014/0096999 A1 | 4/2014 | Okada et al. | |
| 2015/0244233 A1 | 8/2015 | Hattori | |

(Continued)

FOREIGN PATENT DOCUMENTS

| | | |
|---|---|---|
| CN | 204465168 U | 7/2015 |
| JP | H03-184214 A | 8/1991 |
| JP | 2002-044892 A | 2/2002 |

(Continued)

OTHER PUBLICATIONS

Office Action dated Dec. 30, 2020 issued in corresponding CN patent application No. 201780090175.8 (and English machine translation).

(Continued)

*Primary Examiner* — Robert W Horn
(74) *Attorney, Agent, or Firm* — Posz Law Group, PLC

(57) ABSTRACT

A stator includes a stator core and a winding wound around the stator core in wave winding. The winding includes an assembly of a plurality of covered wires, and an outer cover film that surrounds and covers the assembly and contains thermosetting resin. Each of the covered wires includes a conductor and an insulating film surrounding and covering the conductor. Each of the covered wires has a wire width of 1.5 mm or less.

13 Claims, 19 Drawing Sheets

(56) References Cited

U.S. PATENT DOCUMENTS

2019/0363598 A1* 11/2019 Coppola ................ H02K 3/24

FOREIGN PATENT DOCUMENTS

| | | |
|---|---|---|
| JP | 2007-227265 A | 9/2007 |
| JP | 2008-236924 A | 10/2008 |
| JP | 2010-239679 A | 10/2010 |
| JP | 2013-187076 A | 9/2013 |
| JP | 2014-75300 A | 4/2014 |
| JP | 5742805 B2 | 7/2015 |
| JP | 2016-085846 A | 5/2016 |
| JP | 2016-111732 A | 6/2016 |

OTHER PUBLICATIONS

Office Action dated Jul. 7, 2020 issued in corresponding JP patent application No. 2019-519905 (and English translation).
Office Action dated Dec. 22, 2020 issued in corresponding JP patent application No. 2019-519905 (and English translation).
International Search Report of the International Searching Authority dated Aug. 22, 2017 for the corresponding international application No. PCT/JP2017/019558 (and English translation).
Office Action dated Jul. 1, 2021, issued in corresponding CN Patent Application No. 201780090175.8 (and English Machine Translation).

* cited by examiner

STATOR, MOTOR, COMPRESSOR, AND AIR CONDITIONER

CROSS REFERENCE TO RELATED APPLICATION

This application is a U.S. national stage application of International Patent Application No. PCT/JP2017/019558 filed on May 25, 2017, the disclosure of which is incorporated herein by reference.

TECHNICAL FIELD

The present invention relates to a stator, a motor, a compressor, and an air conditioner.

BACKGROUND

Winding methods of a stator winding in a motor include concentrated winding and distributed winding. Distributed winding is often used in a motor used in an air conditioner and the like, since distributed winding is more advantages in suppressing noise and vibration than concentrated winding. Among types of distributed winding, concentric winding is often used. However, wave winding is more advantageous than concentric winding in that coil end parts can be made smaller. In the case of wave winding, it is necessary to bend a winding at the coil end parts, and therefore the winding is required to have high strength.

As a winding for distributed winding, there is known a winding obtained by covering a rectangular conductor with a magnetic material layer and further covering the magnetic material layer with an insulating cover film (Patent Reference 1). There is also known a collective winding obtained by covering a bundle of a plurality of copper wires with an insulating cover film (Patent Reference 2). Further, there is also known a winding obtained by covering a rectangular conductor with a cover film of thermosetting resin and further covering the cover film with another cover film of thermoplastic resin (Patent Reference 3).

PATENT REFERENCE

Patent Reference 1: Japanese Patent No. 5742805 (see FIG. 3)
Patent Reference 2: Japanese Patent Application Publication No. 2016-85846 (see FIG. 3)
Patent Reference 3: Japanese Patent Application Publication No. 2016-111732 (see FIG. 1)

In order to increase strength of a winding, it is necessary to increase a cross-sectional area of the winding. When the cross-sectional area of the winding is large, current may concentrate on a surface of a conductor because of the skin effect in the case where an electric frequency increases in accordance with the number of revolutions of a motor. This may cause an increase in effective resistance (that is, copper loss) and may result in a reduction in motor efficiency.

SUMMARY

The present invention is made to solve the above problem, and an object of the present invention is to increase strength of a winding and to reduce effective resistance of the winding.

A stator of the present invention includes a stator core and a winding wound around the stator core in wave winding. The winding includes an assembly of a plurality of covered wires, and an outer cover film that surrounds and covers the assembly and contains thermosetting resin. Each of the plurality of covered wires includes a conductor and an insulating film that covers the conductor. Each of the plurality of covered wires has a wire width of 1.5 mm or less.

In the present invention, the winding includes the plurality of covered wires, each including the conductor and the insulating film and having the wire width of 1.5 mm or less, and the outer cover film of thermosetting resin covering the plurality of covered wires. Therefore, it is possible to increase strength of the winding, and to suppress the skin effect to thereby reduce effective resistance.

DETAILED DESCRIPTION

First Embodiment (Configuration of Motor)

Figure 1:
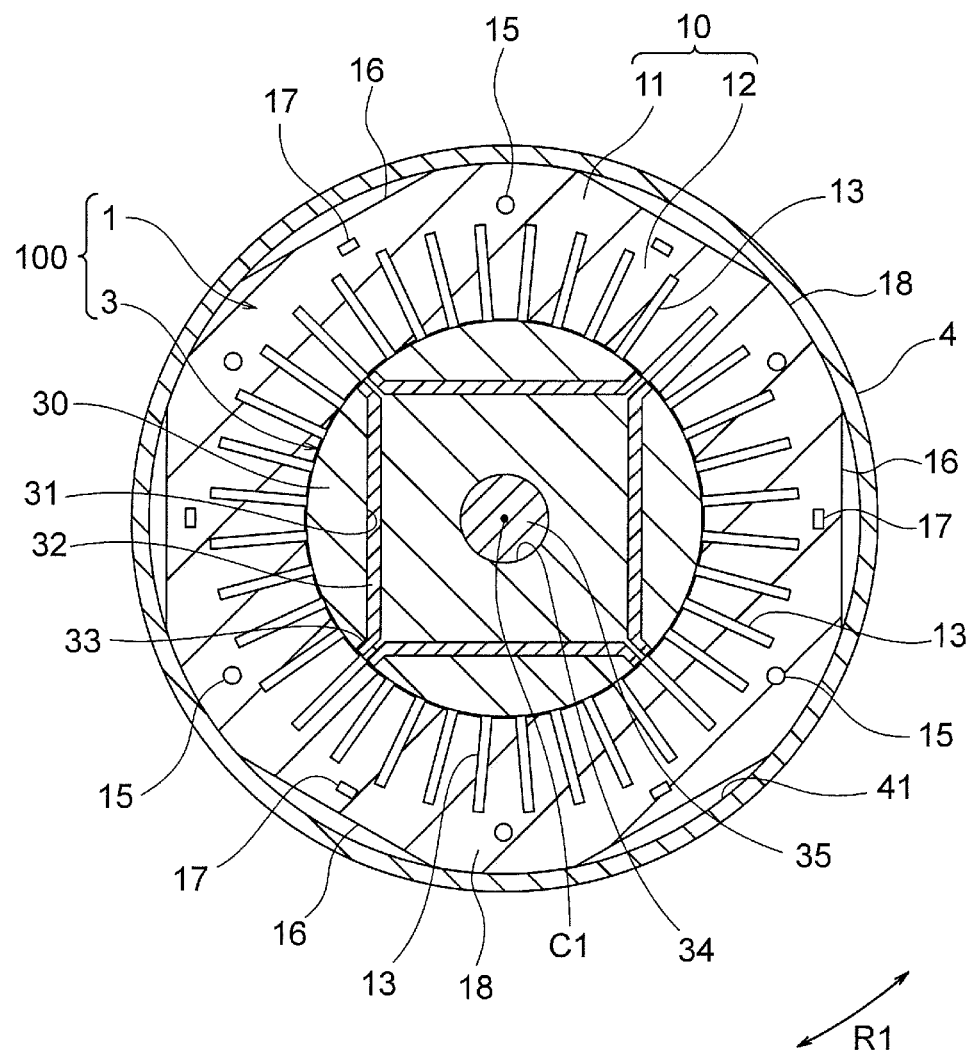
FIG. 1 is a sectional view illustrating a motor of a first embodiment.

FIG. 1 is a sectional view illustrating a motor 100 of a first embodiment. This motor 100 is a brushless DC motor and is used in a compressor 500 (FIG. 20) described later. Moreover, this motor 100 is a permanent magnet embedded type motor having permanent magnets 32 embedded in a rotor 3.

The motor 100 includes a stator 1 and the rotor 3 rotatably provided on an inner side of the stator 1. An air gap is formed between the stator 1 and the rotor 3. The stator 1 is incorporated in a cylindrical shell 4 of the compressor 500.

The rotor 3 includes a cylindrical rotor core 30 and the permanent magnets 32 attached to the rotor core 30. The rotor core 30 is obtained by stacking a plurality of electromagnetic steel sheets each having a thickness of 0.25 to 0.5 mm, for example, in a direction of a rotation axis and fixing the sheets by crimping or the like. A circular shaft hole 34 is formed at a center of the rotor core 30 in a radial direction. A shaft 35 that is a rotation shaft is fixed to the shaft hole by press fitting. An axis C1 that is a center axis of the shaft 35 defines the rotation axis of the rotor 3.

Hereinafter, a direction of the axis C1 of the shaft 35 is referred to as an "axial direction". A circumferential direction (indicated by an arrow R1 in FIG. 1) about the axis C1 is referred to as a "circumferential direction". A direction of a radius about the axis C1 is referred to as a "radial direction".

A plurality of magnet insertion holes 31 are formed along an outer circumference of the rotor core 30, and are arranged at equal intervals in the circumferential direction. In this example, the number of the magnet insertion holes 31 is four. The magnet insertion holes 31 pass through the rotor core 30 in the axial direction. Moreover, each magnet insertion hole 31 linearly extends along the outer circumference of the rotor core 30.

The permanent magnet 32 is disposed in the magnet insertion hole 31. The permanent magnet 32 is a member in the form of a flat plate, and has a length in the axial direction, a width in the circumferential direction, and a thickness in the radial direction. One permanent magnet 32 is disposed in each magnet insertion hole 31. However, a plurality of permanent magnets 32 may be disposed in each magnet insertion hole 31.

In this example, the number of poles P of the rotor 3 is four. However, the number of the poles P of the rotor 3 is not limited to four, and it is sufficient that the number of the poles P of the rotor 3 is two or more. Moreover, although one magnet insertion hole 31 and one permanent magnet 32 correspond to each magnetic pole in this example, a plurality of magnet insertion holes 31 may correspond to each magnetic pole, or a plurality of permanent magnets 32 may correspond to each magnetic pole.

A center of the magnet insertion hole 31 in the circumferential direction is a pole center. In this example, the magnet insertion hole 31 extends in a direction perpendicular to a line (also referred to as a magnetic-pole center line) in the radial direction which passes through the pole center. A part between the magnet insertion holes 31 adjacent to each other is an inter-pole part.

The permanent magnet 32 is formed of a rare earth sintered magnet containing neodymium (Nd), iron (Fe), boron (B), and dysprosium (Dy). Since the rare earth sintered magnet has high residual magnetic flux density and high coercivity, a length of the rotor 3 in the axial direction required for obtaining a desired output can be shortened.

The permanent magnet 32 may be formed of a ferrite sintered magnet containing iron oxide. Although the ferrite sintered magnet has lower residual magnetic flux density and lower coercivity than the rare earth sintered magnet, the ferrite sintered magnet is inexpensive and stably procurable, and thus has a merit such that manufacturing cost can be reduced.

Each permanent magnet 32 is magnetized in such a manner that outer and inner sides thereof in the radial direction have mutually opposite magnetic poles. Moreover, the permanent magnets 32 adjacent to each other in the circumferential direction have mutually opposite magnetic poles facing the outer circumference side.

Flux barriers 33 are formed at both ends of the magnet insertion hole 31 in the circumferential direction. The flux barriers 33 are openings extending in the radial direction from the ends of the magnet insertion hole 31 in the circumferential direction toward the outer circumference of the rotor core 30. The flux barriers 33 are provided for suppressing leakage magnetic flux between the magnetic poles adjacent to each other (i.e., magnetic flux flowing through the inter-pole part).

(Configuration of Stator)

The stator 1 includes a stator core 10 and a winding 2 (FIG. 3) wound around the stator core 10 in wave winding. The stator core 10 is obtained by stacking a plurality of electromagnetic steel sheets each having a thickness of 0.25 to 0.5 mm, for example, in the axial direction and fixing the sheets by crimping parts 17.

The stator core 10 includes an annular yoke part 11 and a plurality of teeth 12 extending inward in the radial direction from the yoke part 11. In the example illustrated in FIG. 1, the number of the teeth 12 is thirty-six. A width (a length in the circumferential direction) of each tooth 12 decreases toward a tip of the tooth 12, that is, decreases inward in the radial direction.

A slot 13 is formed between each two teeth 12 adjacent to each other in the circumferential direction. The slots 13 are parts for accommodating the winding 2 wound around the teeth 12, and extend in the radial direction. The number of the slots 13 is the same as the number of the teeth 12, and is referred to as a slot number S. In the example illustrated in FIG. 1, the slot number S is thirty-six, and nine slots 13 correspond to each magnetic pole of the rotor 3.

In three-phase distributed winding, the slot number S is 3n (n is a natural number) times the pole number P. Therefore, a ratio S/P of the slot number S to the pole number P is 3, 6, 9, 12, and 15, for example.

Through holes 15 are formed in the stator core 10, and the through holes 15 pass through the stator core 10 in the axial direction. The through holes 15 are formed at a plurality of positions in the circumferential direction in the yoke part 11. In this example, six through holes 15 are arranged at equal intervals in the circumferential direction. The through holes 15 constitute refrigerant passages through which refrigerant passes in the axial direction. The through holes 15 may be used as rivet holes through which rivets are inserted. A cross-sectional shape of each through hole 15 is a circular shape in this example, but is not limited to the circular shape.

Figure 2:
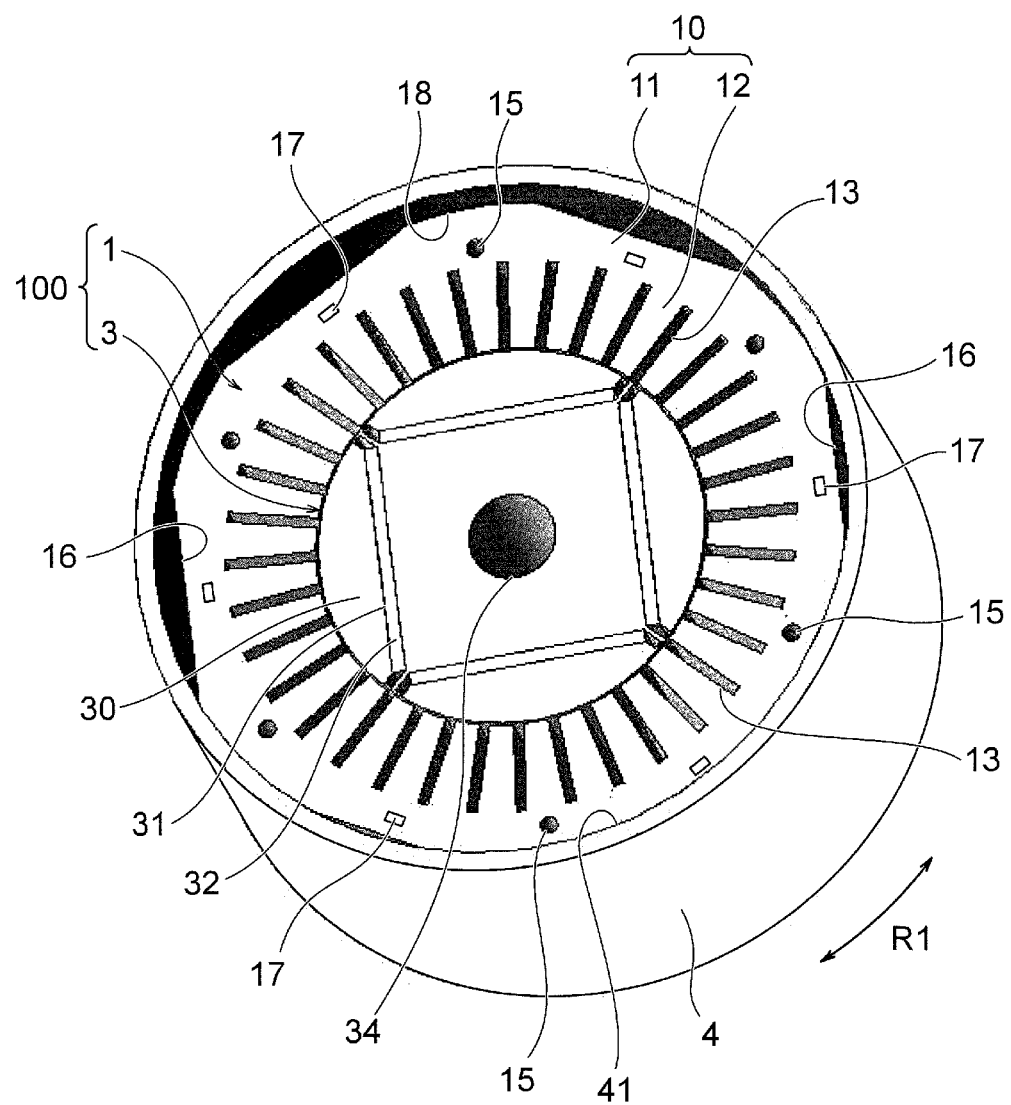
FIG. 2 is a perspective view illustrating the motor of the first embodiment in which no winding is wound.

FIG. 2 is a perspective view illustrating the motor 100 in a state where the winding 2 is not wound around the stator core 10. As illustrated in FIG. 2, the yoke part 11 of the stator core 10 has a cylindrical outer circumferential surface 18.

The outer circumferential surface 18 is fitted to an inner circumferential surface 41 of the cylindrical shell 4.

Cutout parts 16 are formed on the outer circumferential surface 18 of the stator core 10. Each cutout part 16 is formed by cutting the cylindrical outer circumferential surface 18 by a plane parallel to the axis C1. The cutout parts 16 are formed at a plurality of positions in the circumferential direction in the yoke part 11. Six cutout parts 16 are arranged at equal intervals in the circumferential direction in this example. A refrigerant passage through which refrigerant passes in the axial direction is formed between each cutout part 16 and the inner circumferential surface 41 of the shell 4.

Moreover, the crimping parts 17 for fixing the electromagnetic steel sheets of the stator core 10 to each other are formed in the yoke part 11. This is for preventing the crimping parts 17 from obstructing a flow of magnetic flux.

Figure 3:
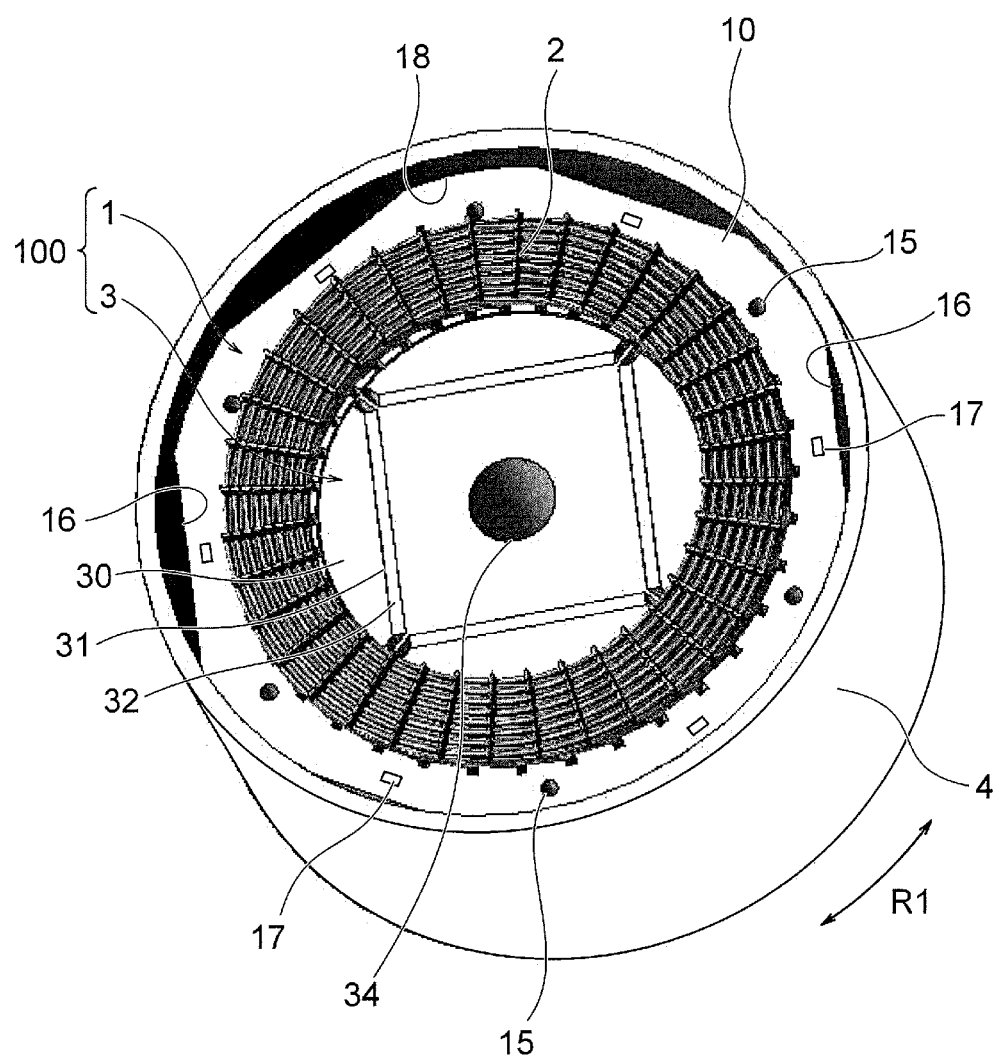
FIG. 3 is a perspective view illustrating the motor of the first embodiment in which a winding is wound.

FIG. 3 is a perspective view illustrating the motor 100 in which the winding 2 is wound around the stator core 10. The winding 2 is wound around thirty-six teeth 12 of the stator core 10 in wave winding. Since the winding 2 is wound in wave winding, an outward protruding amount of the winding 2 in the radial direction from the teeth 12 is small. Therefore, the winding 2 does not obstruct a flow of refrigerant passing through the through holes 15 and the cutout parts 16.

Moreover, since the winding 2 is wound in wave winding, a protruding amount of the winding 2 in the axial direction from the stator core 10 is also small as compared with a case where the winding 2 is wound in concentric winding. That is, in the entire length of the winding 2, the coil end parts that do not contribute to generation of a driving force are small, and thus desired torque can be obtained at a lower current, so that motor efficiency is enhanced. Further, since the protruding amount of the winding 2 in the axial direction is small, a length of the motor 100 in the axial direction is short.

Figure 4B:
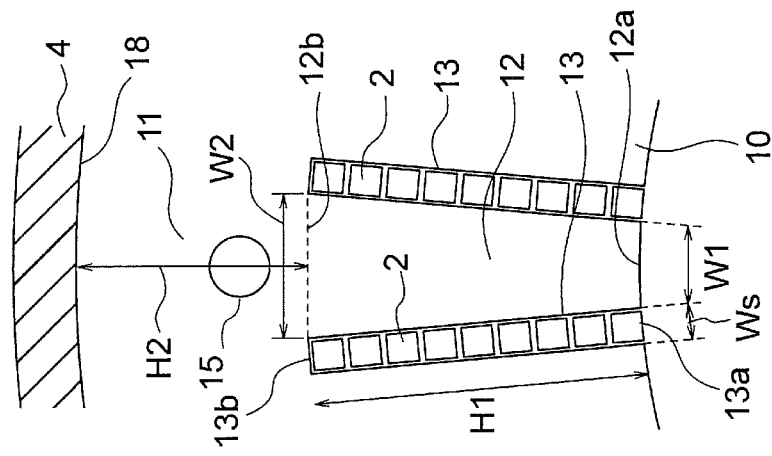
FIG. 4(B) is an enlarged schematic diagram illustrating a tooth and its surrounding part.
Figure 4A:
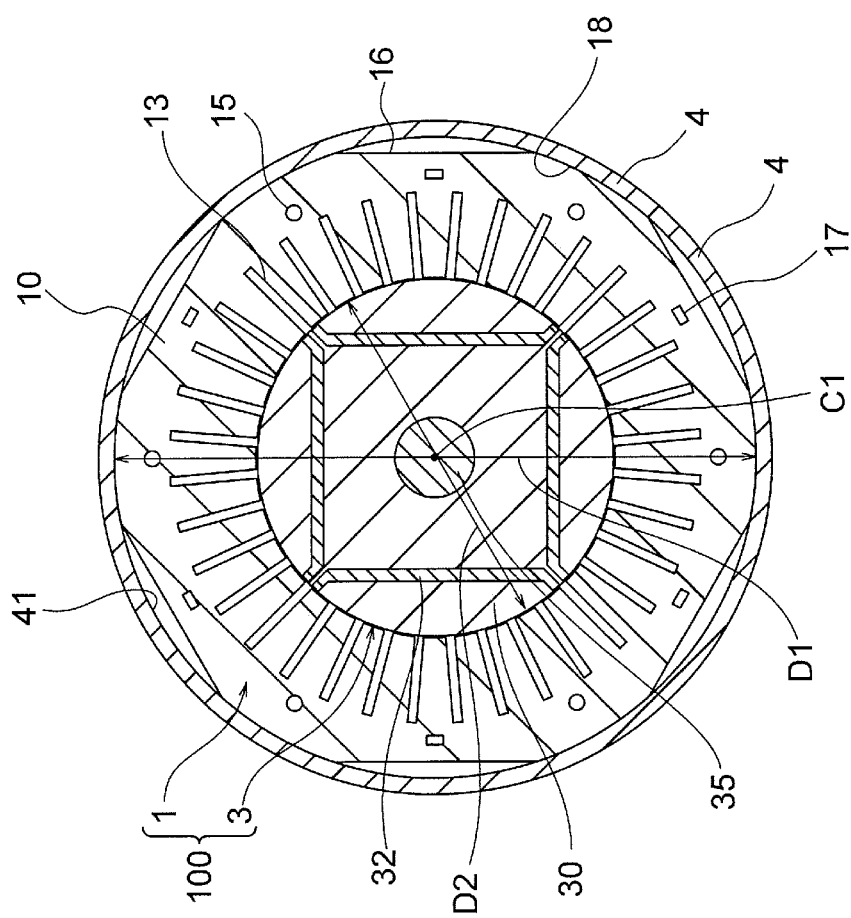
FIG. 4(A) is a schematic diagram for explaining dimensions of parts of the motor of the first embodiment.

FIG. 4(A) is a schematic diagram for explaining dimensions of parts of the motor 100. A diameter of the stator 1, that is, a diameter D1 of the stator core 10 is set to such a length that the stator 1 can be fitted to the inner circumferential surface 41 of the shell 4. A diameter D2 of the rotor 3 (that is, a diameter of the rotor core 30) is 60 to 120 mm, for example.

FIG. 4(B) is an enlarged schematic diagram illustrating a part of the stator 1. As described above, the width of the tooth 12 decreases toward a tip 12a of the tooth 12. When the width of the tooth 12 at the tip 12a (an inner end in the radial direction) is represented by W1 and the width of the tooth 12 at its base 12b (an outer end in the radial direction) is represented by W2, W1<W2 is satisfied.

A length in the radial direction of the tooth 12 (that is, a distance from the base 12b to the tip 12a) is represented by H1. H1 is also a length of each slot 13. Moreover, a distance from the base 12b of the tooth 12 to the outer circumferential surface 18 of the yoke part 11 (a yoke width) is represented by H2. The yoke width H2 is a width of a magnetic path that flows in the yoke part 11 in the circumferential direction.

Winding parts of the winding 2 are arranged in a row in each slot 13. A width Ws in the circumferential direction of the slot 13 is set to such a width that the winding parts of the winding 2 are arranged in a row. That is, the slot 13 has a rectangular shape having the width Ws in the circumferential direction and the length H1 in the radial direction. An inner end of the slot 13 in the radial direction is an opening 13a through which the winding parts of the winding 2 are inserted, and an outer end of the slot 13 in the radial direction is a closed end 13b.

(Configuration of Winding)

Figure 5:
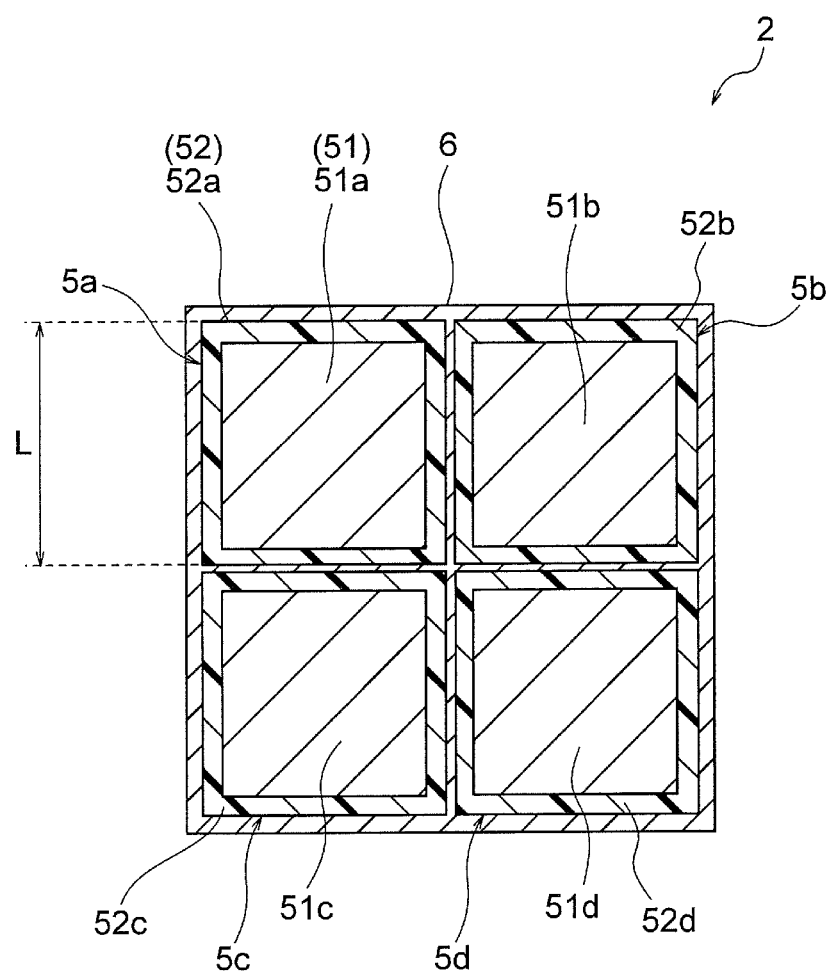
FIG. 5 is a sectional view illustrating a cross-sectional structure of the winding of the first embodiment.

Next, the winding 2 will be described. FIG. 5 is a sectional view illustrating a cross-sectional structure of the winding 2. As illustrated in FIG. 5, the winding 2 includes an assembly of four covered wires 5a, 5b, 5c, and 5d arranged in two rows and two columns and an outer cover film 6 that covers the assembly. The covered wires 5a, 5b, 5c, and 5d are collectively referred to as covered wires 5.

A cross-sectional shape of each of the covered wires 5a, 5b, 5c, and 5d is a square. A wire width of each of the covered wires 5a, 5b, 5c, and 5d is defined by a length L of one side of the square and is 1.0 to 1.5 mm.

The covered wires 5a, 5b, 5c, and 5d include conductors 51a, 51b, 51c, and 51d and insulating films 52a, 52b, 52c, and 52d that surround and cover the conductors 51a, 51b, 51c, and 51d, respectively.

A cross-sectional shape of each of the conductors 51a, 51b, 51c, and 51d is a square. The conductors 51a, 51b, 51c, and 51d are made of copper or aluminum. The conductors 51a, 51b, 51c, and 51d are collectively referred to as conductors 51.

A thickness of each of the insulating films 52a, 52b, 52c, and 52d is 30 to 50 µm, for example. Each of the insulating films 52a, 52b, 52c, and 52d has electrical insulating properties and is made of polyesterimide or polyamideimide, for example. The insulating films 52a, 52b, 52c, and 52d are collectively referred to as insulating films 52.

A thickness of the outer cover film 6 is 0.1 to 0.2 mm, for example. The outer cover film 6 is made of unsaturated polyester resin, for example. Moreover, it is desirable to add glass fiber to unsaturated polyester resin in order to increase strength. Unsaturated polyester resin can be easily transformed to a complicated shape and is excellent in workability. Therefore, unsaturated polyester resin is suitable for winding work in wave winding.

In FIG. 5, the outer cover film 6 is also provided between the adjacent covered wires 5a, 5b, 5c, and 5d. However, the outer cover film 6 is not limited to this configuration, and it is sufficient that the cover film 6 surrounds and covers the covered wires 5a, 5b, 5c, and 5d.

Since the winding 2 is constituted by the assembly of the four covered wires 5a, 5b, 5c, and 5d and further has the outer cover film 6 as above, it is possible to obtain such high strength that the winding 2 is not broken by being bent at the coil end part, and to obtain high heat resistance.

Moreover, the conductors 51a, 51b, 51c, and 51d of the covered wires 5a, 5b, 5c, and 5d are insulated from one another by the insulating films 52a, 52b, 52c, and 52d. Since a cross-sectional area of each of the conductors 51a, 51b, 51c, and 51d is small, an increase in effective resistance caused by the skin effect (that is, an increase in copper loss) is suppressed.

Figure 6:
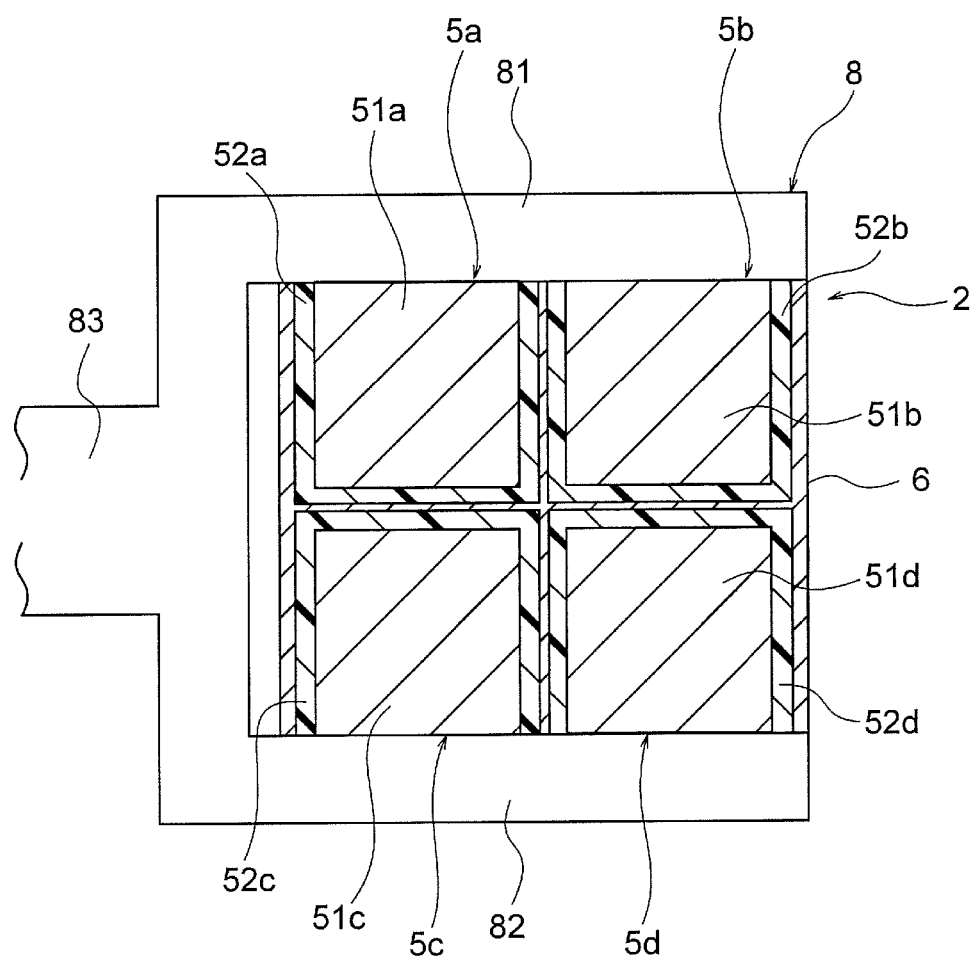
FIG. 6 is a sectional view illustrating the winding and a terminal part of the first embodiment.

FIG. 6 is a diagram illustrating the winding 2 and a terminal part 8 connected to the winding 2. The terminal part 8 includes a connection part 81 connected to the conductors 51a and 51b of the covered wires 5a and 5b, a connection part 82 connected to the conductors 51c and 51d of the covered wires 5c and 5d, and a support part 83 that supports the connection parts 81 and 82.

In a region where the connection part 81 and the conductors 51a and 51b are in contact with each other, parts of the insulating films 52a and 52b and a part of the outer cover film 6 are removed to ensure electrical conduction. Similarly, in a region where the connection part 82 and the conductors 51c and 51d are in contact with each other, parts of the insulating films 52c and 52d and a part of the outer cover film 6 are removed to ensure electrical conduction.

Figure 7:
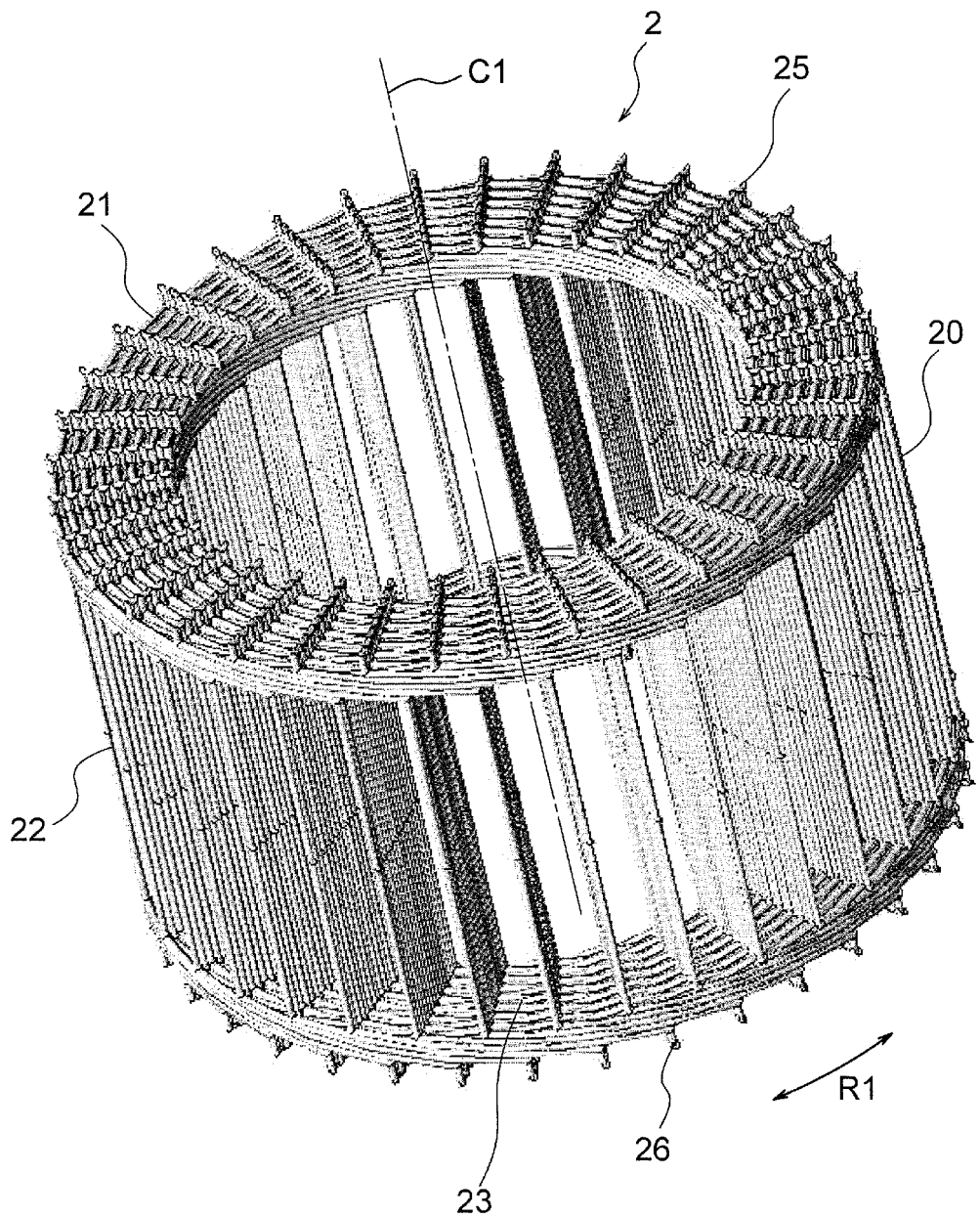
FIG. 7 is a perspective view illustrating the winding of the first embodiment.

FIG. 7 is a schematic diagram illustrating the winding 2 wound in wave winding. The winding 2 has a straight part 22 inserted in the slots 13 (FIG. 1), a coil end part 21 extending in the circumferential direction on one end surface of the rotor core 30 in the axial direction, and a coil end part 23 extending in the circumferential direction on the other end surface of the rotor core 30 in the axial direction. In this example, eight winding parts 20 of the winding 2 are inserted in each slot 13 (FIG. 1).

Figure 8:
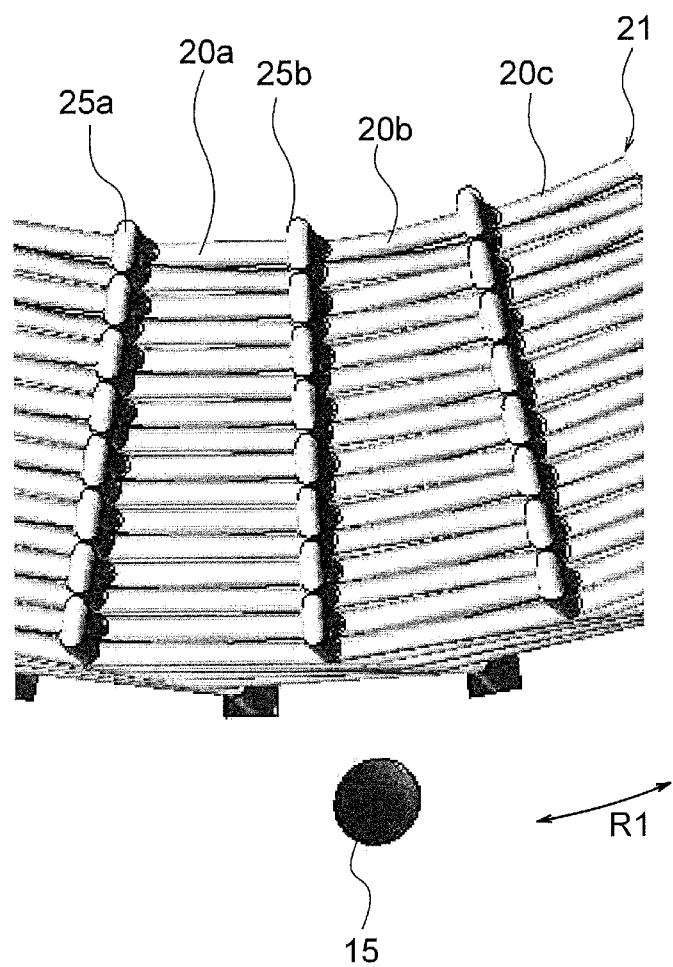
FIG. 8 is an enlarged schematic diagram illustrating a part of the winding of the first embodiment.

FIG. 8 is an enlarged diagram illustrating a part of the coil end part 21 of the winding 2. In the coil end part 21, nine winding parts 20 are wound at the same winding position in the radial direction (for example, an innermost position) in such a manner that positions of the winding parts 20 in the circumferential direction are shifted from each other by one slot. Three of the nine winding parts 20 wound at the innermost position are referred to as winding parts 20a, 20b, and 20c.

Figure 9:
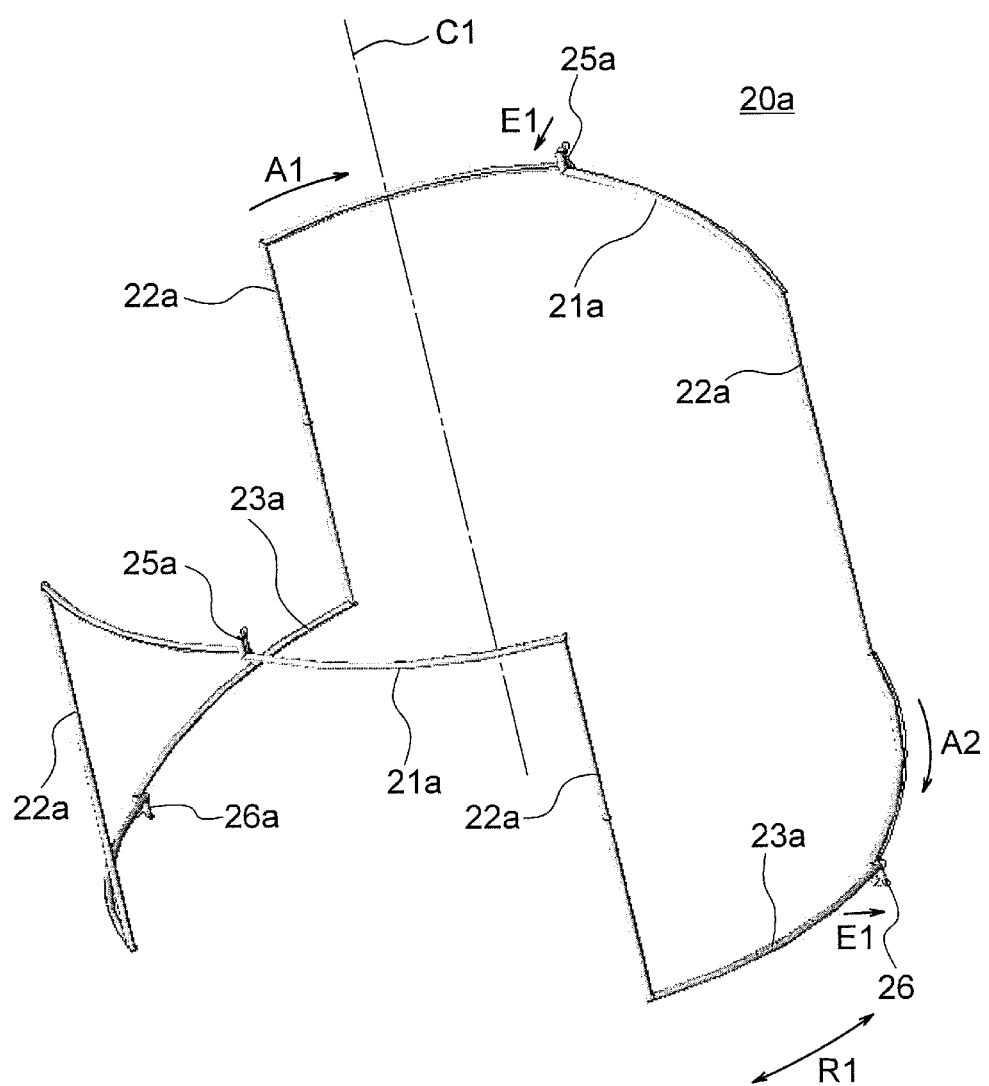
FIG. 9 is a perspective view illustrating one winding part of the winding of the first embodiment.

FIG. 9 is a schematic diagram illustrating one winding part 20a. The winding part 20a has two coil end parts 21a, four straight parts 22a, and two coil end parts 23a. The winding part 20a is wound so as to span nine teeth 12. That is, the straight parts 22a of the winding part 20a are inserted in every nine slots 13.

The coil end part 21a extends to connect ends of the straight parts 22a in the axial direction (upper ends in FIG. 9) to each other, and the coil end part 23a extends to connect the other ends of the straight parts 22a in the axial direction (lower ends in FIG. 9) to each other. The coil end parts 21a and the coil end parts 23a are alternately arranged in the circumferential direction about the axis C1.

A nose part 25a is provided at a center part of the coil end part 21a in the circumferential direction, and the coil end part 21a is displaced in the radial direction by a displacement amount E1 at the nose part 25a. The coil end part 21a extends clockwise in the circumferential direction about the axis C1 as indicated by an arrow A1 in FIG. 9, is displaced inward in the radial direction by the displacement amount E1 at the nose part 25a, and extends again in the direction indicated by the arrow A1.

A nose part 26a is provided at a center part of the coil end part 23a in the circumferential direction, and the coil end part 23a is displaced in the radial direction by the displacement amount E1 at the nose part 26a. The coil end part 23a extends clockwise in the circumferential direction about the axis C1 as indicated by an arrow A2 in FIG. 9, is displaced outward in the radial direction by the displacement amount E1 at the nose part 26a, and extends again in the direction indicated by the arrow A2.

Figure 10:
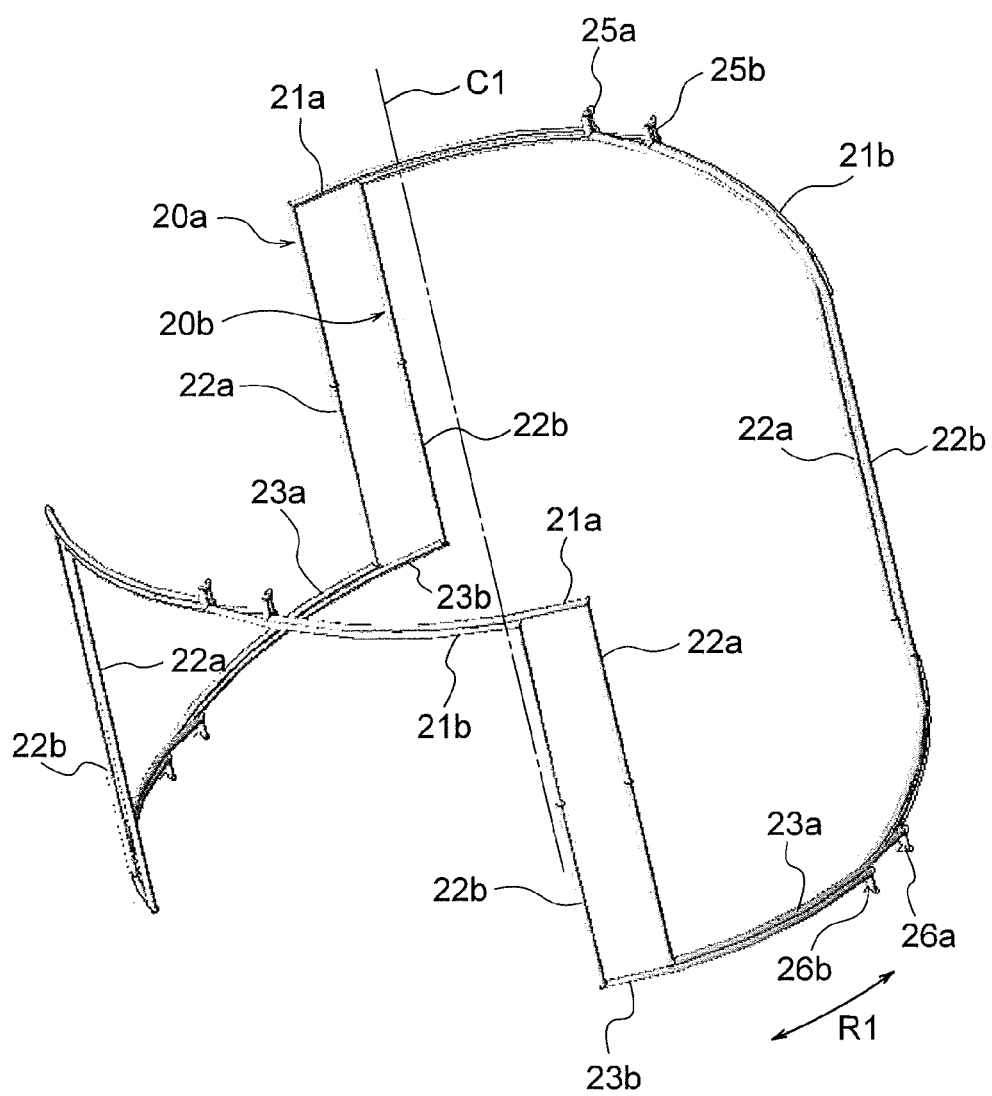
FIG. 10 is a perspective view illustrating two winding parts of the winding of the first embodiment.

FIG. 10 is a schematic diagram illustrating the two winding parts 20a and 20b. The winding part 20b has two coil end parts 21b, four straight parts 22b, and two coil end parts 23b, as is the case with the winding part 20a.

The straight part 22b of the winding part 20b is shifted clockwise about the axis C1 with respect to the straight part 22a of the winding part 20a by one slot. A nose part 25b is provided at a center part of the coil end part 21b in the circumferential direction, as is the case with the nose part 25a of the coil end part 21a. A nose part 26b is provided at a center part of the coil end part 23b in the circumferential direction, as is the case with the nose part 26a of the coil end part 23a.

The coil end parts 21a and 21b of the winding parts 20a and 20b extend in the circumferential direction while overlapping each other in the axial direction, and their vertical positions (positions in the axial direction) are inverted to each other through the nose parts 25a and 25b. Similarly, the coil end parts 23a and 23b of the winding parts 20a and 20b extend in the circumferential direction while overlapping each other in the axial direction, and their vertical positions are inverted to each other through the nose parts 26a and 26b. Therefore, the straight parts 22a and 22b of the winding parts 20a and 20b can be inserted in the slots 13 adjacent to each other (FIG. 1) without interfering with each other.

Although FIG. 10 illustrates the two winding parts 20a and 20b only, nine winding parts 20 in total including the winding parts 20a and 20b are wound at the same winding position (for example, at the innermost position) in the radial direction as the winding parts 20a and 20b. That is, the straight part 22 of the winding 2 is inserted in each of the thirty-six slots 13 of the stator core 10.

Figure 11:
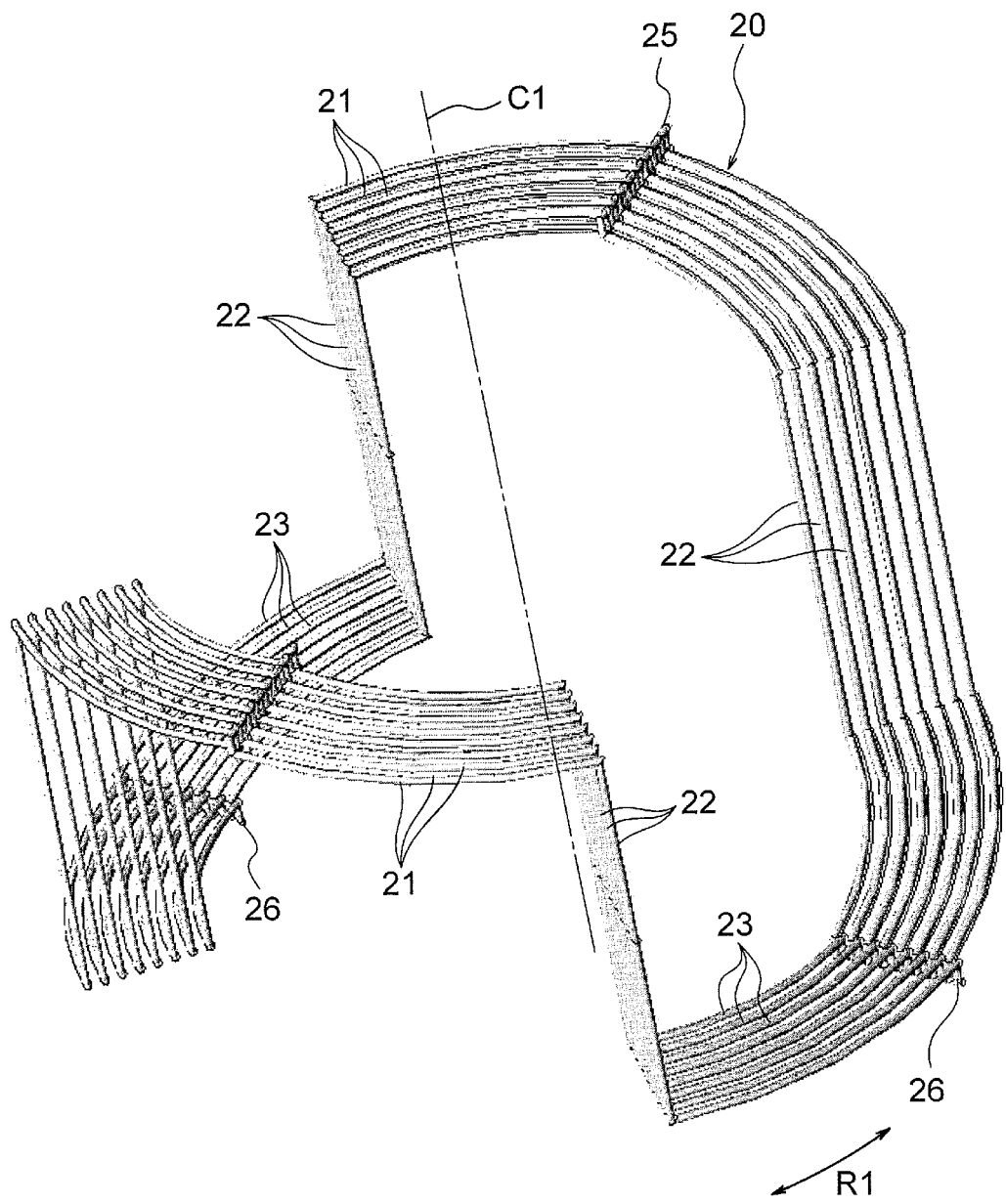
FIG. 11 is a perspective view illustrating winding parts inserted into the same slot of a stator of the first embodiment.

FIG. 11 is a schematic diagram illustrating eight winding parts 20 in total inserted in the same slots 13 in which the winding part 20a illustrated in FIG. 9 is inserted. The eight winding parts 20 are wound at equal intervals in the radial direction. By winding the winding parts 20 while shifting the winding parts 20 from each other by one slot in the circumferential direction (FIG. 10) and also winding the winding parts 20 in the radial direction as above, the winding 2 in wave winding illustrated in FIG. 7 is formed.

The number of the winding parts 20 inserted in each slot 13 and the number of the teeth 12 spanned by each winding part 20 are not limited to those in the example illustrated in FIGS. 7 to 11, and can be set to any numbers in accordance with the pole number P and the slot number S.

As described above, when the winding 2 is wound in wave winding, it is necessary to bend the winding 2 at the coil end parts 21 and 23, like the nose parts 25 and 26 illustrated in FIG. 11. The winding 2 of the first embodiment has a configuration in which the assembly of the covered wires 5a, 5b, 5c, and 5d is covered by the outer cover film 6 as illustrated in FIG. 5, and thus has high strength. Therefore, it is possible to prevent the winding 2 from being broken by being bent.

Comparative Example

Figure 12:
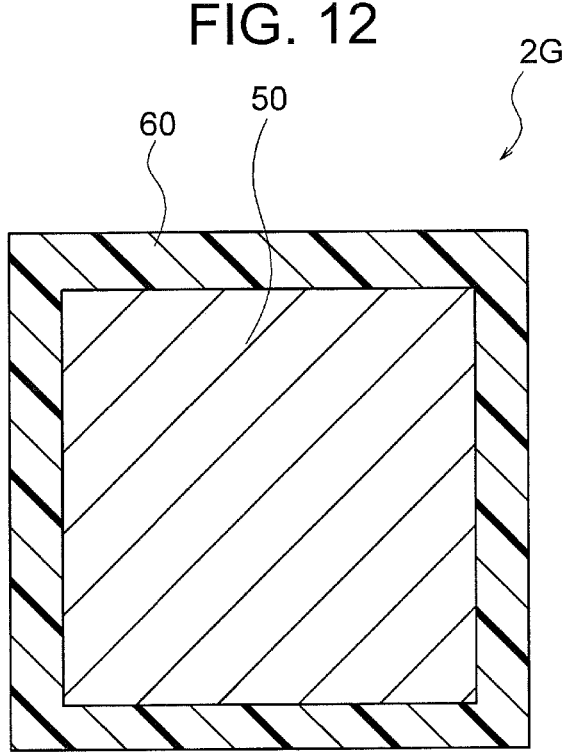
FIG. 12 is a sectional view illustrating a winding of a comparative example.

Next, a winding 2G of a comparative example will be described. FIG. 12 is a sectional view illustrating the winding 2G of the comparative example. The winding 2G of the comparative example includes one conductor 50 having a square cross-sectional shape and an insulating film 60 that surrounds and covers the conductor 50. A wire width (that is, a length of one side) of the conductor 50 is twice the wire width (1 to 1.5 mm) of the conductor 51 illustrated in FIG. 5.

(Uniformizing of Current Density Distribution in Cross-Section of Winding)

Figure 13:
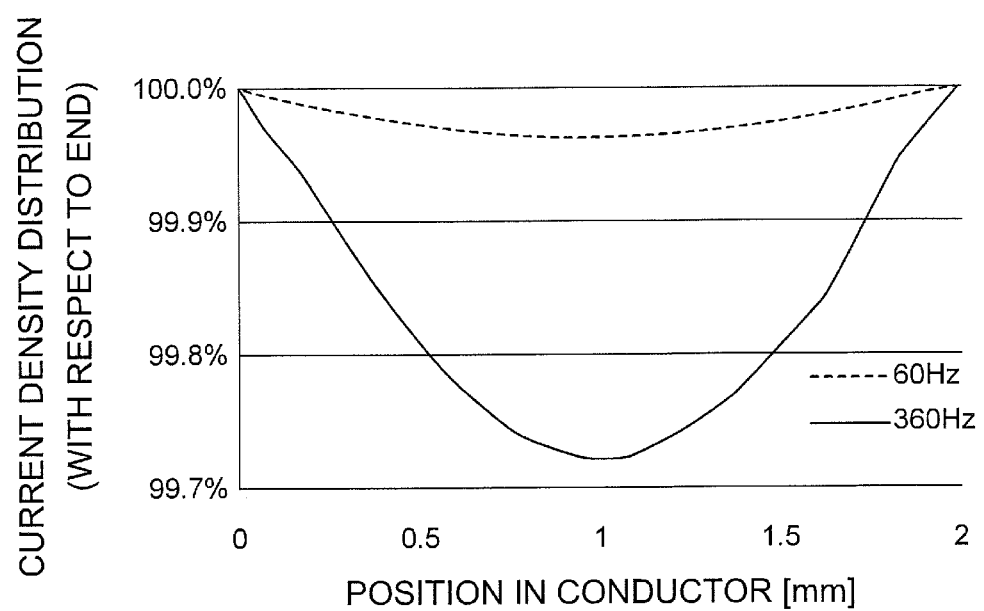
FIG. 13 is a graph illustrating in comparison a current density distribution in the winding of the first embodiment and a current density distribution in the winding of the comparative example.

Next, a uniformizing effect of a current density (that is, an effect of suppressing the skin effect) in a cross-section of the winding according to the first embodiment will be described. FIG. 13 is a graph illustrating a current density distribution in a cross-section of the winding when the wire width of the conductor 50 of the winding 2G of the comparative example illustrated in FIG. 12 is 2 mm. In FIG. 13, a horizontal axis represents a position in a cross-section of the conductor 50, and a vertical axis represents a current density.

The current density is calculated by magnetic field analysis on the assumption that a potential distribution is uniform inside the conductor 50. Electrical frequencies are set to 60 Hz and 360 Hz. The current density is represented as a ratio (%) to a current density at a surface (an outer circumferential surface) of the conductor 50 which is expressed as 1.

From FIG. 13, when the electrical frequency is 60 Hz, no substantial difference is found between the current density at the surface of the conductor 50 (positions of 0 mm and 2 mm) and the current density at the center of the conductor 50 (position of 1 mm). Meanwhile, when the electrical frequency is 360 Hz, the current density at the center of the conductor 50 is reduced by 0.3% with respect to the current density at the surface of the conductor 50. This is considered to be caused by the skin effect in a high frequency band.

Figure 14:
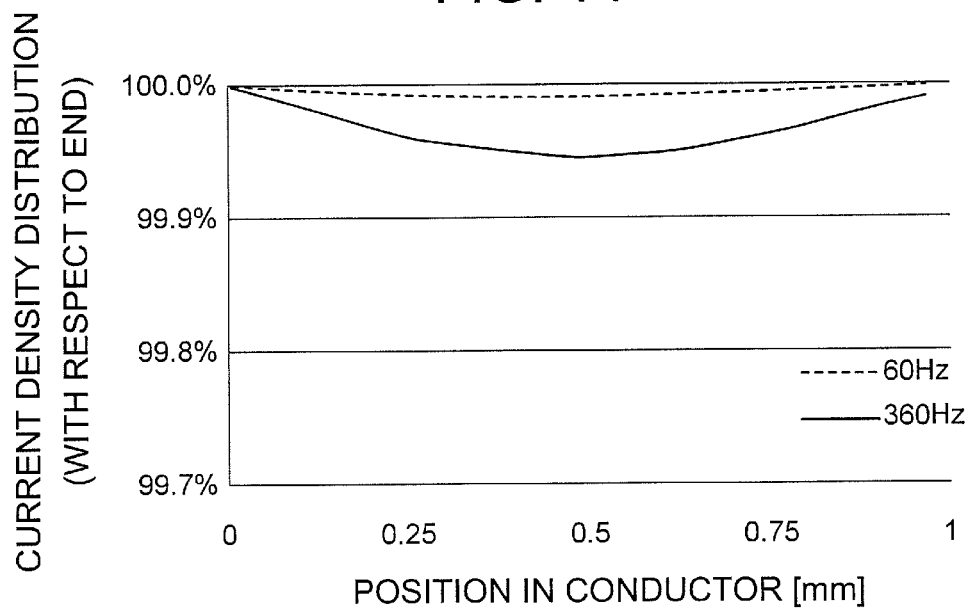
FIG. 14 is a graph illustrating in comparison the current density distribution in the winding of the first embodiment and the current density distribution in the winding of the comparative example.

FIG. 14 is a graph illustrating a current density distribution in a cross-section of the winding when the wire width of the conductor 51 of the winding 2 of the first embodiment illustrated in FIG. 5 is 1 mm. In FIG. 14, a horizontal axis represents a position in a cross-section of the conductor 51, and a vertical axis represents a current density. The current density is calculated by magnetic field analysis as described above. Electrical frequencies are set to 60 Hz and 360 Hz. The current density is represented as a ratio (%) to a current density at a surface of the conductor 51 which is expressed as 1.

From FIG. 14, when the electrical frequency is 60 Hz, no substantial difference is found between the current density at the surface of the conductor 51 (positions of 0 mm and 2 mm position) and the current density at the center of the conductor 51 (position of 1 mm). Moreover, when the electrical frequency is 360 Hz, reduction in the current density at the center of the conductor 51 with respect to the current density at the surface of the conductor 51 remains at 0.05%. That is, it is understood that the skin effect in a high frequency band is suppressed in the first embodiment.

Figure 15:
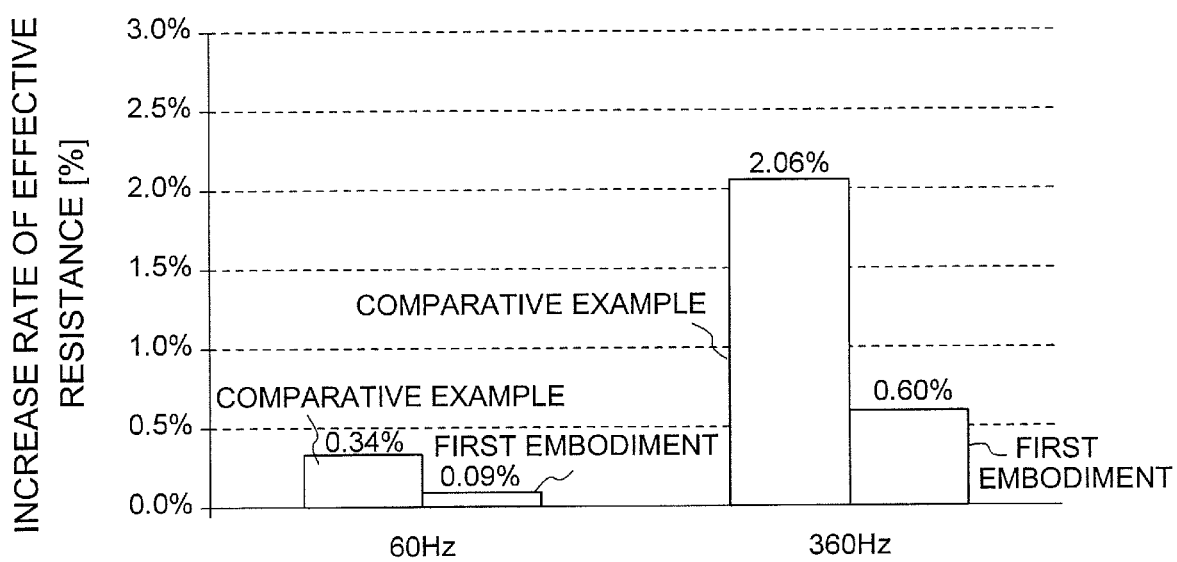
FIG. 15 is a graph illustrating in comparison an effective resistance in the winding of the first embodiment and an effective resistance in the winding of the comparative example in comparison.

FIG. 15 is a graph illustrating in comparison an increase rate of an effective resistance (copper loss) in the comparative example and an increase rate of an effective resistance in the first embodiment. An increase rate of the effective resistance is a rate of increase (%) in effective resistance when each of an alternating current of 60 Hz and an alternating current of 360 Hz flows through a conductor, with respect to an effective resistance when a direct current flows through the conductor.

FIG. 15 shows that whereas the increase in effective resistance at the electrical frequency of 360 Hz is 2.06% in the comparative example, the increase in effective resistance at the same electrical frequency of 360 Hz is 0.60% in the first embodiment. This is considered to be because the cross-sectional area of the conductor 51 of the first embodiment is smaller than the cross-sectional area of the conductor 50 of the comparative example and the skin effect is suppressed in the first embodiment.

That is, although a total cross-sectional area of the conductors 51a, 51b, 51c, and 51d in the winding 2 of the first embodiment is equal to the cross-sectional area of the conductor 50 of the comparative example, the cross-sectional area of each of the conductors 51a, 51b, 51c, and 51d is set to be small and the conductors 51a, 51b, 51c, and 51d are insulated from one another. Therefore, the skin effect can be suppressed, and the increase in effective resistance (copper loss) can be suppressed.

Although the cross-sectional shape of each of the covered wires 5a, 5b, 5c, and 5d is a square in this example, it may be a rectangle (see FIG. 19(B) described later). In such a case, it is sufficient that the wire width of each of the covered wires 5a, 5b, 5c, and 5d (that is, a length of a long side of the rectangle) is in a range from 1.0 to 1.5 mm.

Moreover, the cross-sectional shape of each of the covered wires 5a, 5b, 5c, and 5d may be a circle (see FIG. 16 described later). In such a case, it is sufficient that the wire width of each of the covered wires 5a, 5b, 5c, and 5d (that is, a diameter of the circle) is in a range from 1.0 to 1.5 mm.

Advantages of Embodiment

As described above, in the first embodiment of the present invention, the winding 2 of the stator 1 includes the assembly of the covered wires 5a, 5b, 5c, and 5d each including the conductor 51 covered by the insulating film 52, and the outer cover film 6 of thermosetting resin covering the assembly, and the wire width of each of the covered wires 5a, 5b, 5c, and 5d is equal to or smaller than 1.5 mm. Therefore, it is possible to increase the strength of the winding 2 and to suppress the skin effect to thereby reduce the effective resistance. That is, the strength of the winding 2 which is suitable for wave winding can be obtained, and the motor efficiency can be enhanced.

Moreover, since a thickness of the insulating film 52 is 30 to 50 μm, it is possible to effectively insulate individual conductors 51a, 51b, 51c, and 51d to thereby enhance the effect of suppressing the skin effect. Further, since a thickness of the outer cover film 6 is 0.1 to 0.2 mm, the strength of the winding 2 can be increased and flexibility during the winding work can be obtained.

In addition, since the cross-sectional shape of the entire winding 2 is a quadrangle (more desirably, a square), it is easy to accommodate the winding parts of the winding 2 in each slot 13 while arranging the winding parts in a row.

Moreover, since the cross-sectional shape of the conductors 51a to 51d is a quadrangle (more desirably, a square) and four covered wires 5a to 5d are arranged in two rows and two columns, the conductors 51a to 51d can be arranged densely, so that the cross-sectional area of the winding 2 can be made relatively small. Further, since the wire width of the covered wire 5 is 1.0 to 1.5 mm, a current required for generation of torque can be made to flow while suppressing the skin effect.

Further, the winding 2 is wound around the teeth 12 of the stator core 10 in wave winding, and the protruding amount of the winding 2 in the radial direction is small. Therefore, the winding 2 does not obstruct the refrigerant passing through the through holes 15 in the yoke part 11 or the rivets inserted through the through holes 15.

Moreover, since the permanent magnet 32 of the rotor 3 is formed of a rare earth sintered magnet, efficiency and demagnetization resistance of the motor 100 can be enhanced because of high residual magnetic flux density and high coercivity of the rare earth sintered magnet. Furthermore, in the case where the permanent magnet 32 is formed of a ferrite sintered magnet, the manufacturing cost can be reduced.

(Modifications)

First Modification

Next, modifications of the first embodiment will be described. FIG. 16 is a sectional view illustrating a winding 2A of a first modification. The winding 2A illustrated in FIG. 16 includes an assembly of four covered wires 5a, 5b, 5c, and 5d each having a circular cross-sectional shape. The covered wires 5a, 5b, 5c, and 5d are arranged in two rows and two columns.

The covered wires 5a, 5b, 5c, and 5d include conductors 51a, 51b, 51c, and 51d each having a circular cross-sectional shape and insulating films 52a, 52b, 52c, and 52d that surround and cover the conductors 51a, 51b, 51c, and 51d, respectively. A wire width, that is, a diameter of each of the covered wires 5a, 5b, 5c, and 5d is 1.0 to 1.5 mm. A thickness of each of the insulating films 52a, 52b, 52c, and 52d is 30 to 50 μm.

The assembly of the covered wires 5a, 5b, 5c, and 5d are surrounded and covered by the outer cover film 6. The outer cover film 6 is formed in such a manner that the cross-sectional shape of the entire winding 2 is a square. A thickness of the outer cover film 6 varies depending on a position. A thickness of the thinnest part of the cover film 6 is 0.1 to 0.2 mm.

In the first modification, it is possible to increase the strength of the winding 2 and to suppress the skin effect to thereby reduce the effective resistance, as in the first embodiment. Moreover, since the covered wires 5a, 5b, 5c, and 5d each having a circular cross-sectional shape are used, the use amount of a conductor material is smaller as compared with when square covered wires are used. Further, there is a merit such that the covered wires having circular cross-sections are easily procured since many types of such covered wires are commercially available.

Second Modification

Figure 16:
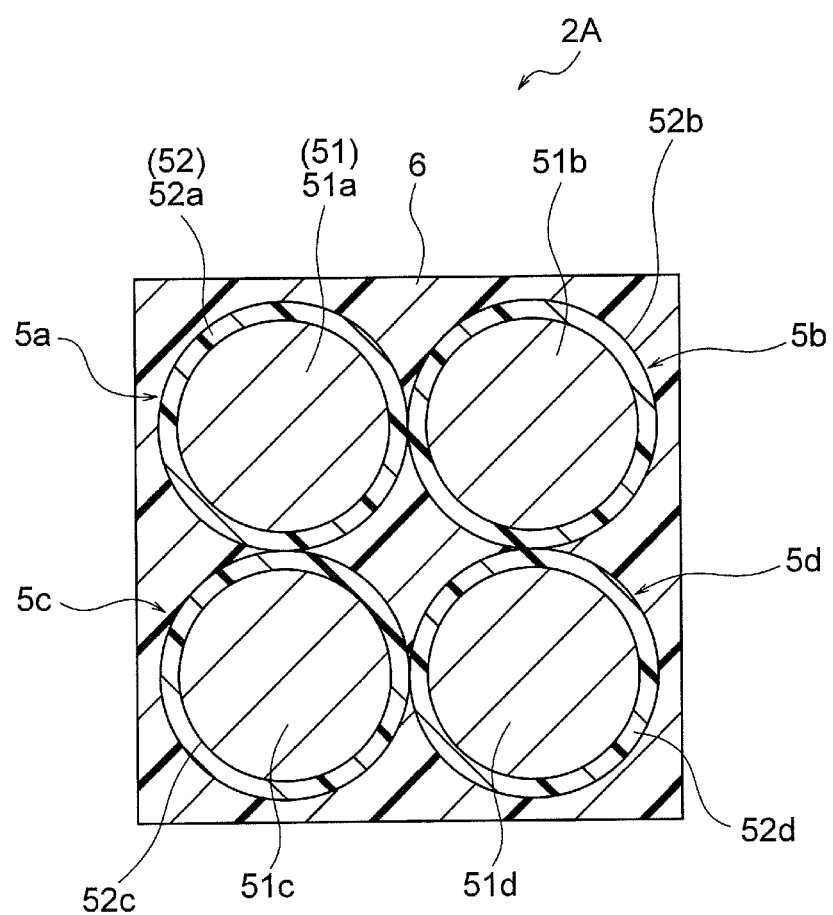
FIG. 16 is a sectional view illustrating a cross-sectional structure of a winding of a first modification.
Figure 17:
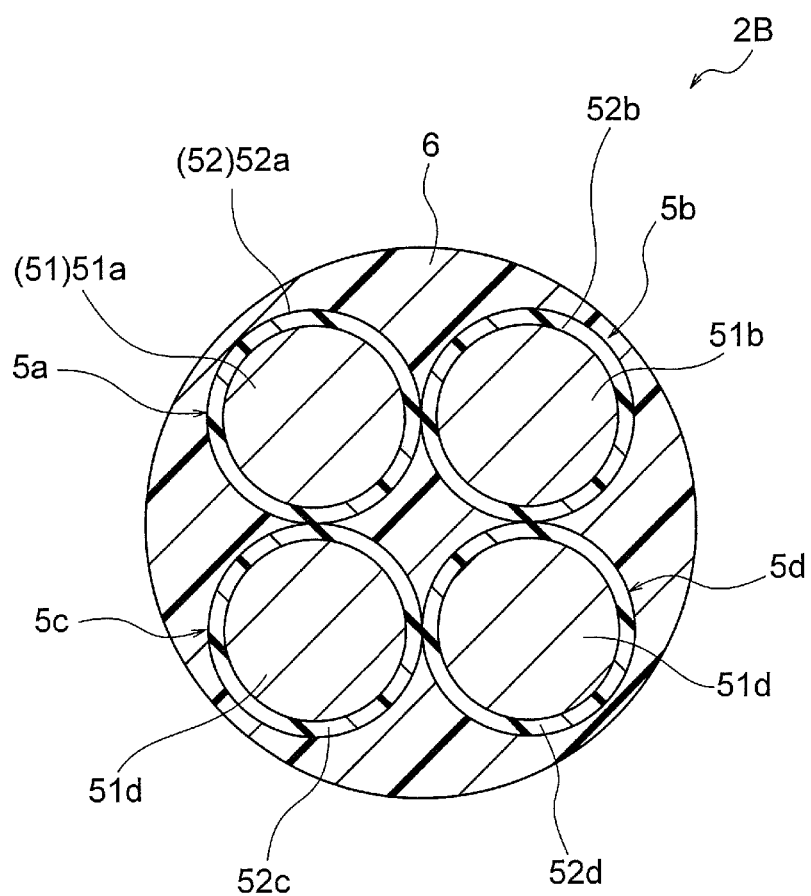
FIG. 17 is a sectional view illustrating a cross-sectional structure of a winding of a second modification.

FIG. 17 is a sectional view illustrating a winding 2B of a second modification. The winding 2B illustrated in FIG. 17 includes an assembly of four covered wires 5a, 5b, 5c, and 5d each having a circular cross-sectional shape. The covered wires 5a, 5b, 5c, and 5d are arranged in two rows and two columns. Structures of the covered wires 5a, 5b, 5c, and 5d are the same as those in the first modification illustrated in FIG. 16.

The assembly of the covered wires 5a, 5b, 5c, and 5d are surrounded and covered by the outer cover film 6. The outer cover film 6 is formed in such a manner that the entire winding 2 has a circular cross-sectional shape. A thickness of the outer cover film 6 varies depending on a position. A thickness of the thinnest part of the cover film 6 is 0.1 to 0.2 mm.

In the second modification, it is possible to increase the strength of the winding 2 and to suppress influence of the skin effect to thereby reduce the effective resistance, as in the first embodiment. Moreover, since the cross-sectional shape of the entire winding 2 is circular, there is a merit such that the winding 2 can be easily bent during the winding work.

Third Modification

Figure 18:
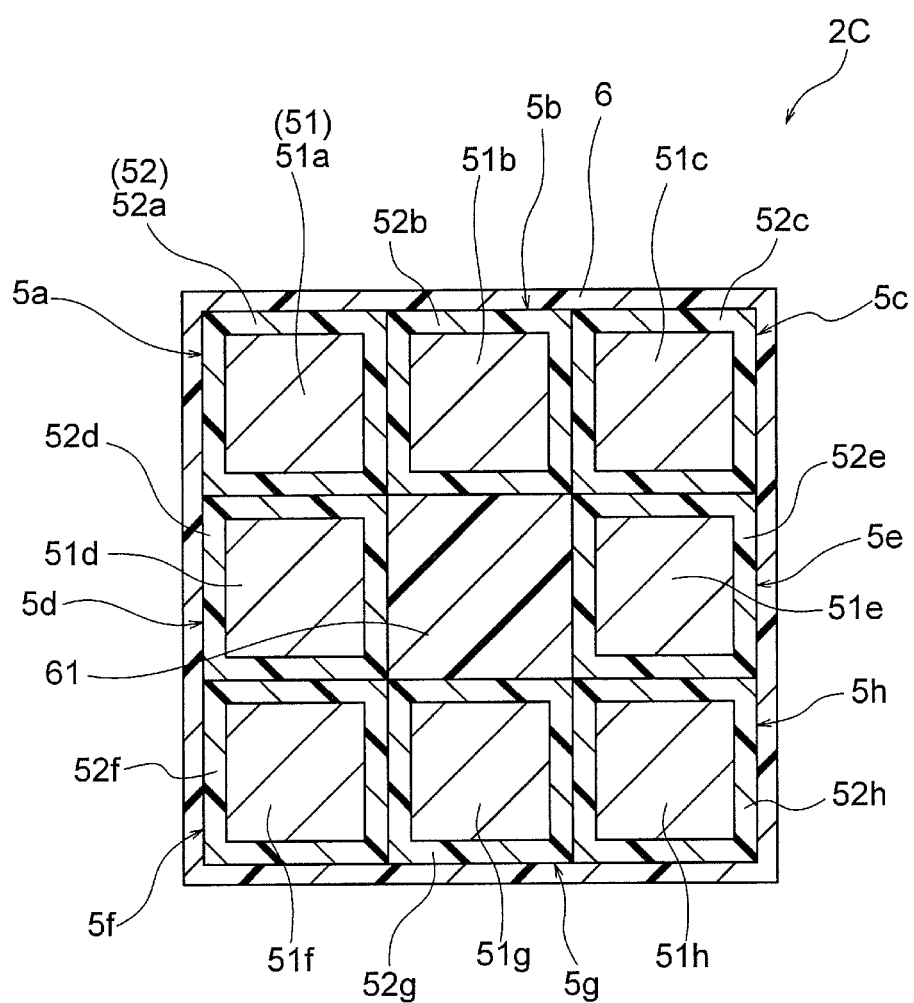
FIG. 18 is a sectional view illustrating a cross-sectional structure of a winding of a third modification.

FIG. 18 is a sectional view illustrating a winding 2C of a third modification. The winding 2C illustrated in FIG. 18 includes an assembly of eight covered wires 5a, 5b, 5c, 5d, 5e, 5f, 5g, and 5h each having a square cross-sectional shape. The covered wires 5a to 5h are arranged at eight positions among nine positions in three columns and three rows, except for a position located at the second row and the second column (a center of the nine positions).

The covered wires 5a, 5b, 5c, 5d, 5e, 5f, 5g, and 5h include conductors 51a, 51b, 51c, 51d, 51e, 51f, 51g, and 51h each having a square cross-sectional shape and insulating films 52a, 52b, 52c, 52d, 52e, 52f, 52g, and 52h that surround and cover the conductors 51a to 51h, respectively. A wire width of each of the covered wires 5a to 5h (that is, a length of one side of the square) is 0.65 to 1.0 mm. A thickness of each of the insulating films 52a to 52h is 30 to 50 μm.

The assembly of the covered wires 5a to 5h are surrounded and covered by the outer cover film 6. A thickness of the outer cover film 6 is 0.1 to 0.2 mm. A cross-sectional shape of the entire wiring 2 is a square.

Since the covered wires 5a to 5h are arranged in three rows and three columns, it is not possible to connect the terminal part 8 (see FIG. 6) to the position in the second column of the second row (the center). Therefore, a resin part 61 of thermosetting resin is provided at the center of the winding 2. The resin part 61 is desirably made of the same material as the outer cover film 6, but may be made of a different material.

Thermosetting resin is higher in strength than copper or aluminum forming the conductors 51a to 51h. Therefore, by providing the resin part 61 of thermosetting resin at the center of the winding 2, the strength of the winding 2 can be further increased. Moreover, thermosetting resin is less expensive than copper or aluminum, and thus manufacturing cost of the winding 2 can be reduced.

Figure 19A:
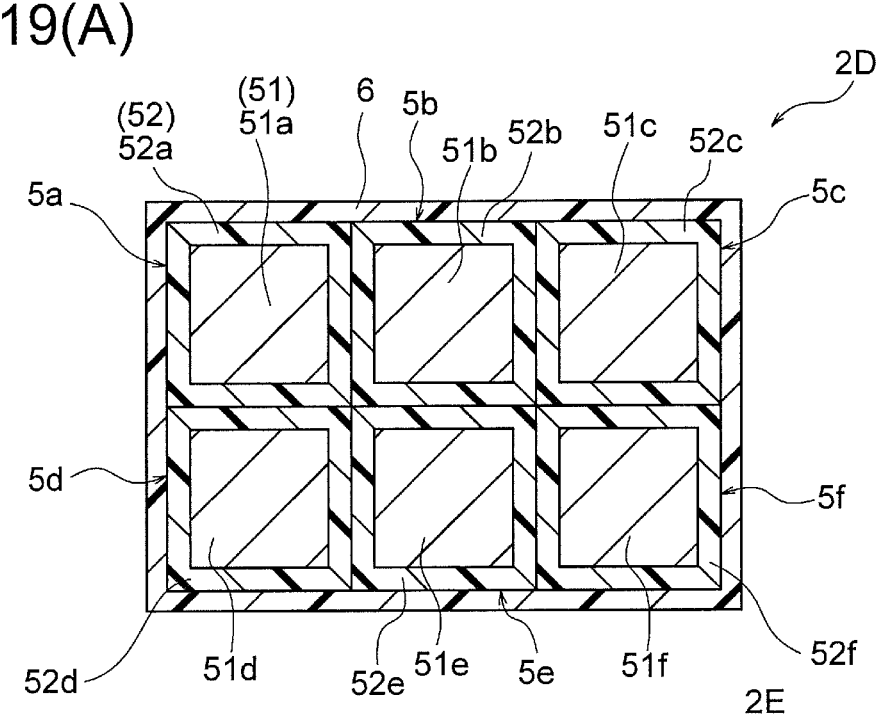
FIGS. 19(A), 19(B) and 19(C) are sectional views respectively illustrating cross-sectional structures of windings of fourth, fifth, and sixth modifications.
Figure 19B:
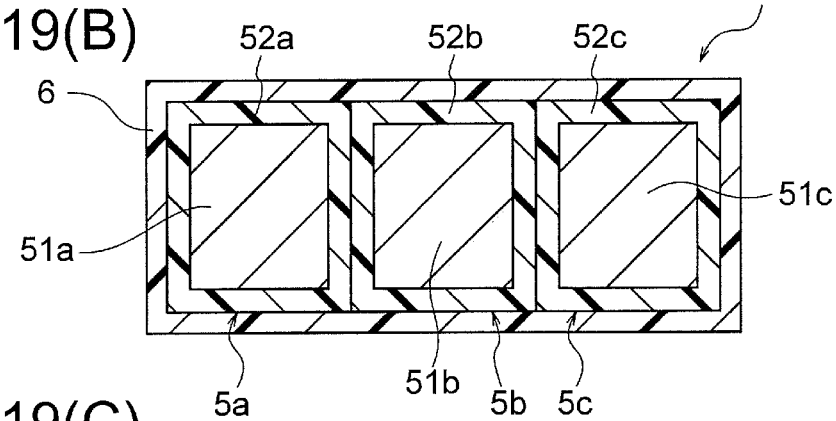

The cross-sectional shape of each of the covered wires 5a to 5h is not limited to a square, and may be a circle as illustrated in FIGS. 16 and 17 or a rectangle as illustrated in FIG. 19(B) described later.

In the third modification, it is possible to increase the strength of the winding 2 and to suppress influence of the skin effect to thereby reduce the effective resistance, as in the first embodiment. Furthermore, since the resin part 61 is formed at the center of the winding 2, the strength of the winding 2 can be further increased and the manufacturing cost can be reduced.

Fourth Modification

FIG. 19(A) is a sectional view illustrating a winding 2D of a fourth modification. The winding 2D illustrated in FIG. 19(A) includes an assembly of six covered wires 5a, 5b, 5c, 5d, 5e, and 5f each having a square cross-sectional shape. The covered wires 5a to 5f are arranged in two rows and three columns.

The covered wires 5a, 5b, 5c, 5d, 5e, and 5f include conductors 51a, 51b, 51c, 51d, 51e, and 51f each having a square cross-sectional shape and insulating films 52a, 52b, 52c, 52d, 52e, and 52f that surround and cover the conductors 51a to 51f, respectively.

A wire width of each of the covered wires 5a to 5f (that is, a length of one side of the square) is 1.0 to 1.5 mm. A thickness of each of the insulating films 52a to 52f is 30 to 50 μm. The assembly of the covered wires 5a to 5f is surrounded and covered by the outer cover film 6. A thickness of the outer cover film 6 is 0.1 to 0.2 mm.

Since the covered wires 5a to 5f are arranged in two rows and three columns in the fourth modification, the cross-sectional shape of the entire wiring 2 is a rectangle.

The cross-sectional shape of each of the covered wires 5a to 5f is not limited to a square, and may be a circle as illustrated in FIGS. 16 and 17, or a rectangle as illustrated in FIG. 19(B) described later.

In the fourth modification, it is possible to increase the strength of the winding 2 and to suppress influence of the skin effect to thereby reduce the effective resistance, as in the first embodiment.

Fifth Modification

FIG. 19(B) is a sectional view illustrating a winding 2E of a fifth modification. The winding 2E illustrated in FIG. 19(B) includes an assembly of three covered wires 5a, 5b, and 5c each having a rectangular cross-sectional shape. The covered wires 5a to 5c are arranged in one row and three columns. Moreover, each of the covered wires 5a, 5b, and 5c has a rectangular cross-sectional shape that is short in a direction of arrangement (a horizontal direction in FIG. 19(B)) and is long in a direction perpendicular to the direction of arrangement (a vertical direction in FIG. 19(B)).

The covered wires 5a, 5b, and 5c include conductors 51a, 51b, and 51c each having a rectangular cross-sectional shape and insulating films 52a, 52b, and 52c that surround and cover the conductors 51a, 51b, and 51c, respectively. A wire width of each of the covered wires 5a, 5b, and 5c (that is, a length of a long side) is 1.0 to 1.5 mm. A thickness of each of the insulating films 52a, 52b, and 52c is 30 to 50 μm. The covered wires 5a, 5b, and 5c are surrounded and covered by the outer cover film 6. A thickness of the outer cover film 6 is 0.1 to 0.2 mm.

Since the covered wires 5a, 5b, and 5c are arranged in one row and three columns in the fifth modification, the cross-sectional shape of the entire wiring 2 is a rectangle. However, since the covered wires 5a, 5b, and 5c are rectangular, a ratio (an aspect ratio) of the long side to the short side of the cross-sectional shape of the winding 2E can be made close to 1. The cross-sectional shape of the covered wires 5a, 5b, and 5c is not limited to a rectangle, and may be a square or a circle.

In the fifth modification, it is possible to increase the strength of the winding 2 and to suppress influence of the skin effect to thereby reduce the effective resistance, as in the first embodiment.

Sixth Modification

Figure 19C:
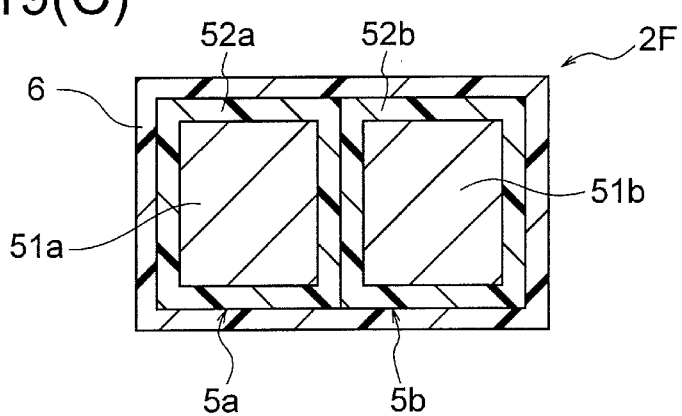

FIG. 19(C) is a sectional view illustrating a winding 2F of a sixth modification. The winding 2F illustrated in FIG. 19(C) includes an assembly of two covered wires 5a and 5b each having a rectangular cross-sectional shape. The covered wires 5a and 5b are arranged in one row and two columns. Each of the covered wires 5a and 5b has a rectangular cross-sectional shape that is short in a direction of arrangement (a horizontal direction in FIG. 19(C)) and is long in a direction perpendicular to the direction of arrangement (a vertical direction in FIG. 19(C)).

The covered wires 5a and 5b include conductors 51a and 51b each having a rectangular cross-sectional shape and insulating films 52a and 52b that surround and cover the conductors 51a and 51b, respectively. A wire width of each of the covered wires 5a and 5b (that is, a length of the long side) is 1.0 to 1.5 mm. A thickness of each of the insulating films 52a and 52b is 30 to 50 μm. The covered wires 5a and 5b are surrounded and covered by the outer cover film 6. A thickness of the outer cover film 6 is 0.1 to 0.2 mm.

Since the covered wires 5a and 5b are arranged in one row and two columns in the sixth modification, the cross-sectional shape of the entire wiring 2 is a rectangle. However, since the covered wires 5a and 5b are rectangular, a ratio (an aspect ratio) of the long side to the short side of the cross-sectional shape of the winding 2F can be made close to 1. The cross-sectional shape of the covered wires 5a and 5b is not limited to a rectangle, and may be a square or a circle.

In the sixth modification, it is possible to increase the strength of the winding 2 and to suppress influence of the skin effect to thereby reduce the effective resistance, as in the first embodiment.

(Compressor)

Figure 20:
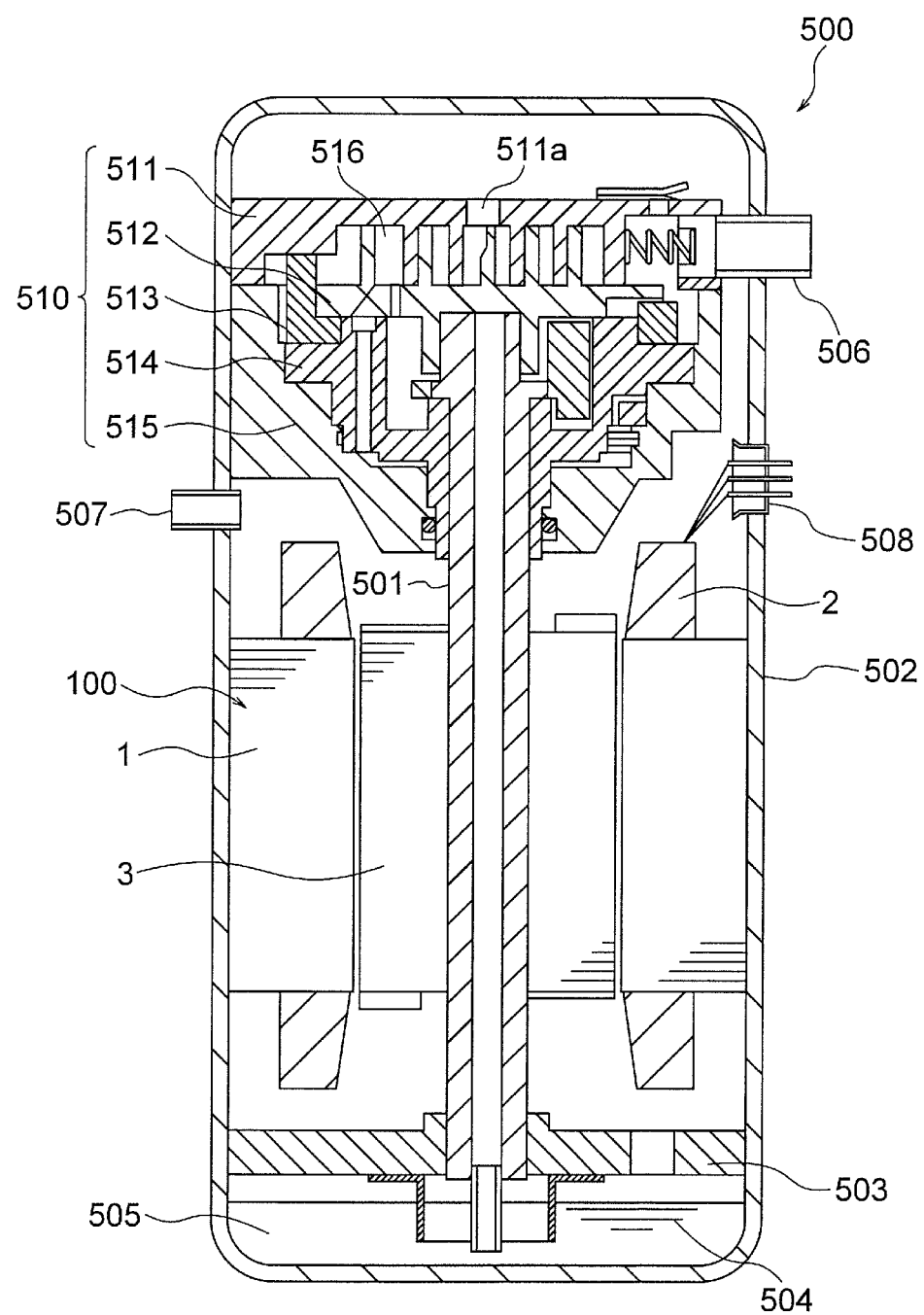
FIG. 20 is a vertical sectional view illustrating a compressor to which the motor of the first embodiment is applied.

Next, a compressor using the motor 100 of the above described first embodiment will be described. FIG. 20 is a sectional view illustrating a configuration of a compressor (scroll compressor) 500 that uses the motor 100 of the above described first embodiment.

The compressor 500 is a scroll compressor and includes, in a closed container 502, a compression mechanism 510, the motor 100 that drives the compression mechanism 510, a main shaft 501 that connects the compression mechanism 510 and the motor 100 to each other, a sub-frame 503 that supports an end (a sub-shaft part) of the main shaft 501 opposite to the compression mechanism 510, and a lubricant 504 stored in an oil reservoir 505 at a bottom of the closed container 502.

The compression mechanism 510 has a fixed scroll 511 and an orbiting scroll 512 attached to the main shaft 501. Each of the fixed scroll 511 and the orbiting scroll 512 has a spiral part, and a spiral compression chamber 516 is formed between the fixed scroll 511 and the orbiting scroll 512. The compression mechanism 510 further includes an Oldham ring 513 that regulates rotation of the orbiting scroll 512 to make the orbiting scroll 512 swing, a compliant frame 514 to which the orbiting scroll 512 is attached, and a guide frame 515 that supports these components.

A suction pipe 506 passing through the closed container 502 is press-fitted to the fixed scroll 511. Moreover, a discharge pipe 507 is provided so as to pass through the closed container 502. The discharge pipe 507 allows high-pressure refrigerant gas discharged from a discharge port 511a of the fixed scroll 511 to be discharged to the outside.

The closed container 502 includes the cylindrical shell 4 (FIG. 1). The motor 100 of the first embodiment is attached to the inner circumferential side of the shell 4. A glass terminal 508 for electrically connecting the stator 1 of the motor 100 and a driving circuit to each other is fixed to the closed container 502 by welding. The main shaft 501 is the shaft 35 of the motor 100 (FIG. 1).

An operation of the compressor 500 is as follows. When the motor 100 rotates, the main shaft 501 (the shaft 35) rotates together with the rotor 3. When the main shaft 501 rotates, the orbiting scroll 512 swings to change a volume of the compression chamber 516 between the fixed scroll 511 and the orbiting scroll 512. Thus, refrigerant gas is sucked from the suction pipe 506 into the compression chamber 516 and is compressed.

The high-pressure refrigerant gas compressed in the compression chamber 516 is discharged into the closed container 502 through the discharge port 511a of the fixed scroll 511, and is discharged to the outside through the discharge pipe 507. Moreover, part of the refrigerant gas discharged into the closed container 502 from the compression chamber 516 passes through the through holes 15 and the cutout parts 16 of the stator 1 (FIG. 1) and cools the motor 100 and the lubricant 504.

As described above, the motor 100 of the first embodiment can provide high motor efficiency due to reduction of effective resistance of the winding 2, and therefore operation efficiency of the compressor 500 can be enhanced. Further, since the winding 2 is wound in wave winding, the motor 100 of the first embodiment provides a sufficient flow rate of refrigerant that passes through the through holes 15 and the cutout parts 16 (FIG. 1) to enhance cooling efficiency of the motor 100, and stability of the operation of the compressor 500 can be enhanced.

The motor 100 of the compressor 500 may be provided with any of the windings 2A to 2F (FIGS. 16 to 19(C)) of the modifications. In addition, a scroll compressor has been described here as an example of a compressor. However, the motors 100 (100A to 100D) of the first embodiment and the modifications may be applied to a compressor other than the scroll compressor.

(Air Conditioner)

Figure 21:
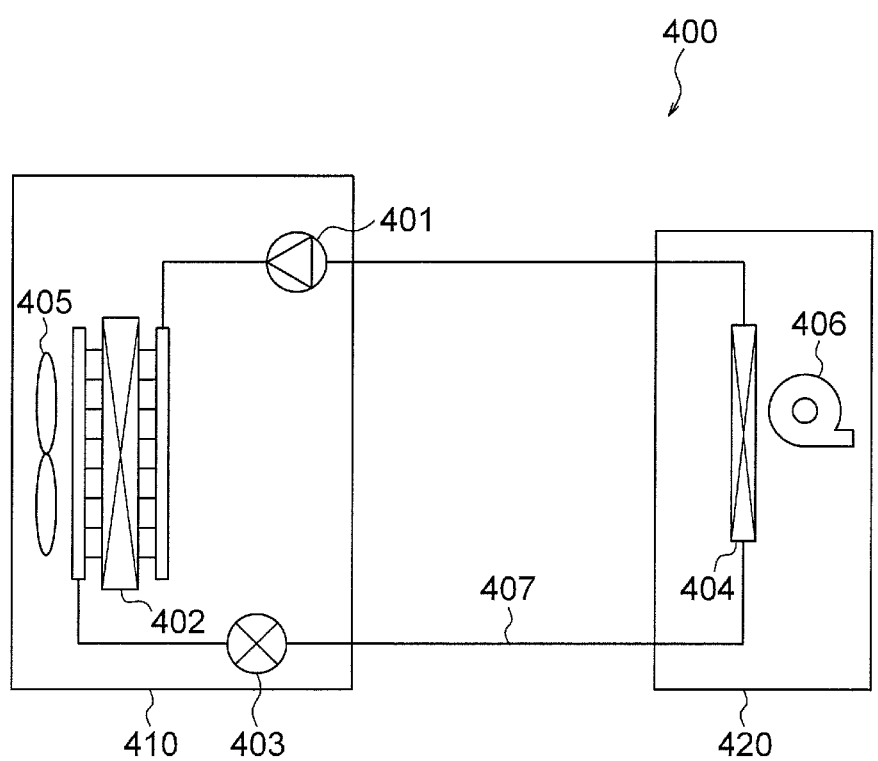
FIG. 21 is a diagram illustrating an air conditioner including the compressor of FIG. 20.

Next, an air conditioner (a refrigerating cycle apparatus) including the compressor 500 illustrated in FIG. 20 will be described. FIG. 21 is a diagram illustrating a configuration of an air conditioner 400. The air conditioner 400 illustrated in FIG. 21 includes a compressor 401, a condenser 402, a restrictor (a decompressor) 403, and an evaporator 404. The compressor 401, the condenser 402, the restrictor 403, and the evaporator 404 are connected by a refrigerant pipe 407 to constitute a refrigerating cycle. That is, refrigerant circulates through the compressor 401, the condenser 402, the restrictor 403, and the evaporator 404 in this order.

The compressor 401, the condenser 402, and the restrictor 403 are provided in an outdoor unit 410. The compressor 401 is constituted by the compressor 500 illustrated in FIG. 20. An outdoor fan 405 for supplying outdoor air to the condenser 402 is provided in the outdoor unit 410. The evaporator 404 is provided in an indoor unit 420. An indoor fan 406 for supplying indoor air to the evaporator 404 is provided in the indoor unit 420.

An operation of the air conditioner 400 is as follows. The compressor 401 compresses sucked refrigerant and sends out the compressed refrigerant. The condenser 402 exchanges heat between the refrigerant flowing from the compressor 401 and the outdoor air, condenses and liquefies the refrigerant, and sends out the refrigerant to the refrigerant pipe 407. The outdoor fan 405 supplies the outdoor air to the condenser 402. The restrictor 403 changes its opening degree to thereby adjust a pressure or the like of the refrigerant flowing through the refrigerant pipe 407.

The evaporator 404 exchanges heat between the refrigerant brought into a low pressure state by the restrictor 403 and the indoor air, causes the refrigerant to take heat from the air and evaporate (vaporize), and sends out the refrigerant to the refrigerant pipe 407. The indoor fan 406 supplies the indoor air to the evaporator 404. Thus, cool wind deprived of heat by the evaporator 404 is supplied into a room.

Since the motor 100 described in the first embodiment and the modifications is applied to the compressor 401 (the compressor 500 in FIG. 20), operation efficiency of the compressor 401 during the operation of the air conditioner 400 can be enhanced, and stability of the operation of the compressor 401 can be enhanced.

The compressor 500 to which a motor having the winding of any of the first embodiment and the modifications is applied is not limited to use in the air conditioner 400 illustrated in FIG. 21. The compressor 500 may be used in another type of air conditioner.

Although the preferred embodiments of the present invention have been described specifically, the present invention is not limited to the above described embodiments, and various improvements and modifications can be made a range not departing from the gist of the present invention.

What is claimed is:

1. A stator comprising a stator core and a winding wound around the stator core in wave winding,
   wherein the winding has an assembly of a plurality of covered wires, and an outer cover film that surrounds and covers the assembly and contains thermosetting resin,
   wherein the plurality of covered wires are eight covered wires located at eight positions arranged in three columns and three rows except for a center located at a second column and second row,
   wherein each of the plurality of covered wires has a conductor and an insulating film surrounding and covering the conductor, and
   wherein each of the plurality of covered wires has a wire width of 1.5 mm or less.

2. The stator according to claim 1, wherein a thickness of the insulating film is 30 μm or more and 50 μm or less.

3. The stator according to claim 1, wherein a thickness of the outer cover film is 0.1 mm or more and 0.2 mm or less.

4. The stator according to claim 1, wherein a cross-sectional shape of the entire winding is a quadrangle or a circle.

5. The stator according to claim 1, wherein a cross-sectional shape of the conductor is a quadrangle or a circle.

6. The stator according to claim 1, wherein each of the covered wires has a wire width of 0.65 mm or more and 1.0 mm or less.

7. The stator according to claim claim 1, wherein the winding includes a resin part formed of thermosetting resin at the center of the plurality of covered wires.

8. The stator according to claim 1, wherein the outer cover film is formed of unsaturated polyester resin to which glass fiber is added.

9. The stator according to claim 1, wherein the stator core comprises:
   a yoke part that extends in a circumferential direction about an axis, and
   a tooth that extends from the yoke part toward the axis, around which the winding is wound, and
   wherein the yoke part has a through hole that passes through the yoke part in a direction of the axis.

10. A motor comprising:
    a rotor; and
    the stator according to claim 1 provided to surround the rotor.

11. The motor according to claim 10, wherein the rotor comprises a rotor core and a rare earth sintered magnet or a ferrite sintered magnet attached to the rotor core.

12. A compressor comprising a motor and a compression mechanism driven by the motor,
    wherein the motor comprises a rotor and the stator according to claim 1 provided to surround the rotor.

13. An air conditioner comprising a compressor, a condenser, a decompressor, and an evaporator,
    wherein the compressor comprises a motor and a compression mechanism driven by the motor, and
    wherein the motor comprises a rotor and the stator according to claim 1 provided to surround the rotor.

* * * * *